United States Patent [19]

Torbeck

[11] Patent Number: 4,556,442
[45] Date of Patent: * Dec. 3, 1985

[54] HAND-HELD ELECTRICALLY SELECTABLE LABELER

[75] Inventor: Daniel J. Torbeck, Dayton, Ohio

[73] Assignee: Monarch Marking Systems, Inc., Dayton, Ohio

[*] Notice: The portion of the term of this patent subsequent to Oct. 4, 2000 has been disclaimed.

[21] Appl. No.: 513,217

[22] Filed: Jul. 13, 1983

Related U.S. Application Data

[63] Continuation of Ser. No. 268,590, May 29, 1981, Pat. No. 4,407,692.

[51] Int. Cl.[4] .............................. B41F 1/08; B41J 3/00
[52] U.S. Cl. .................................. 156/350; 101/93.04;
101/93.05; 101/288; 101/291; 101/292;
101/DIG. 15; 156/384; 156/540; 156/541;
156/577; 156/579
[58] Field of Search .............. 156/277, 350, 384, 540,
156/541, 542, 577, 579, 361, 362, 363;
101/93.04, 93.05, 288, 291, 292, DIG. 15

[56] References Cited

U.S. PATENT DOCUMENTS

| | | | |
|---|---|---|---|
| 3,957,562 | 5/1976 | Hamisch | 156/384 |
| 4,004,672 | 1/1977 | Hirano et al. | 346/76 R |
| 4,116,747 | 9/1978 | Hamisch | 156/384 |
| 4,264,396 | 4/1981 | Stewart | 156/361 |
| 4,294,551 | 10/1981 | Chehovah | 101/93.04 |
| 4,440,248 | 4/1984 | Teraoka | 177/4 |

FOREIGN PATENT DOCUMENTS 2253565  5/1974  Fed. Rep. of Germany .

Primary Examiner—Caleb Weston
Attorney, Agent, or Firm—Mason, Kolehmainen, Rathburn & Wyss

[57] ABSTRACT

There is disclosed a hand-held labeler having a print head with electrically selectable printing elements for printing and applying pressure sensitive labels. The labeler has a housing with a handle and structure for mounting a roll of pressure sensitive labels releasably carried on a carrier web. The labeler has a movable section which mounts a keyboard and a control circuit on a circuit board. The control circuit controls the printing elements. Labels are printed by the printing elements as the carrier web is advanced, and labels are delaminated at a delaminator and dispensed into label applying relation to an applicator.

32 Claims, 34 Drawing Figures

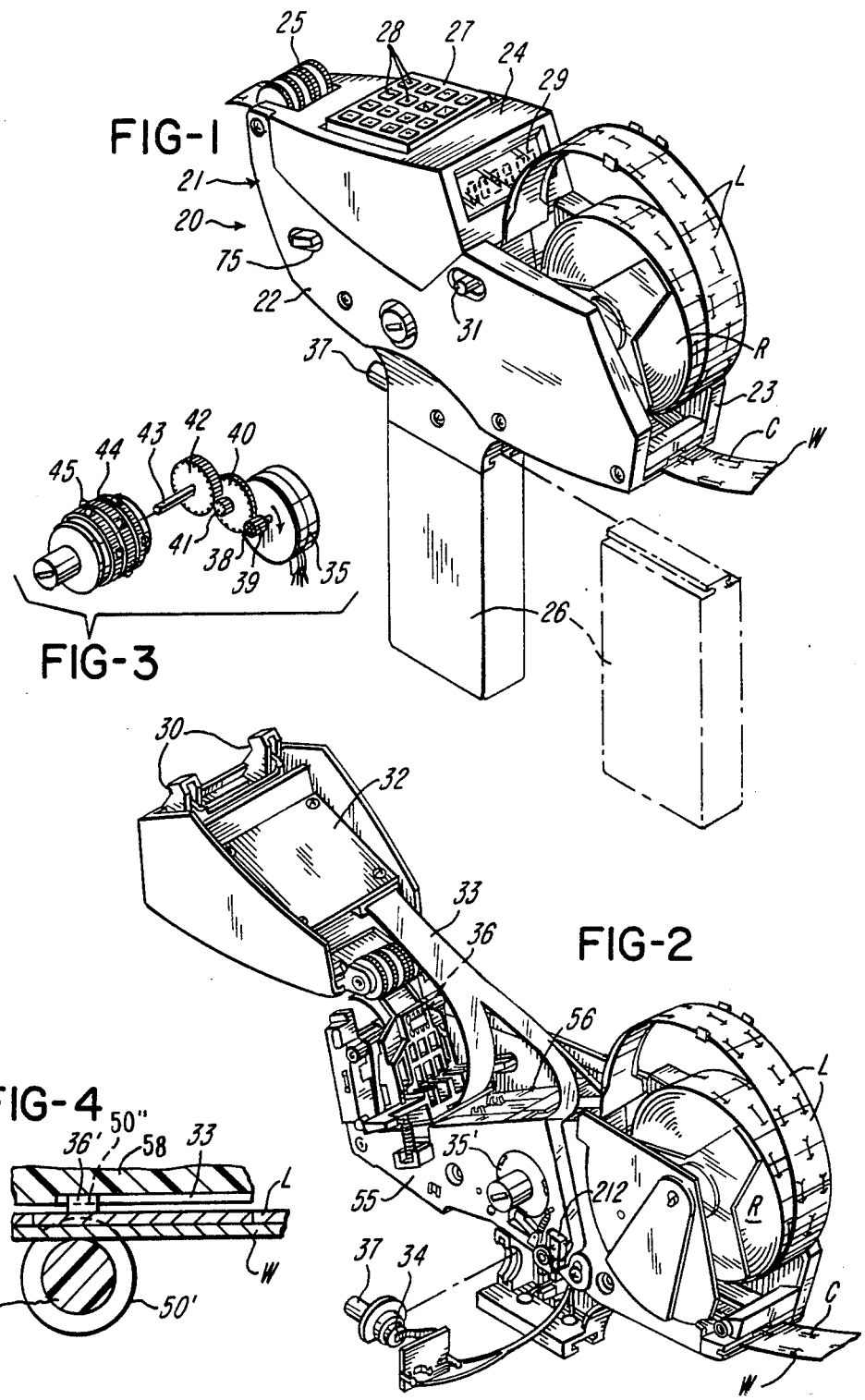

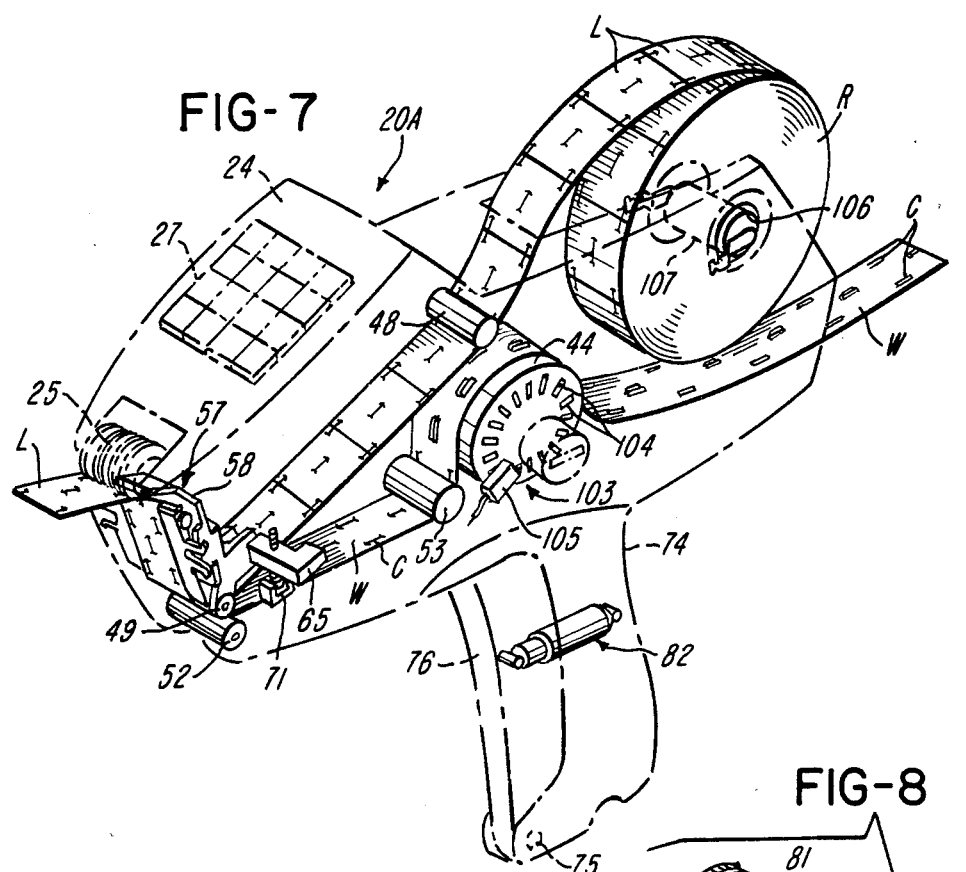

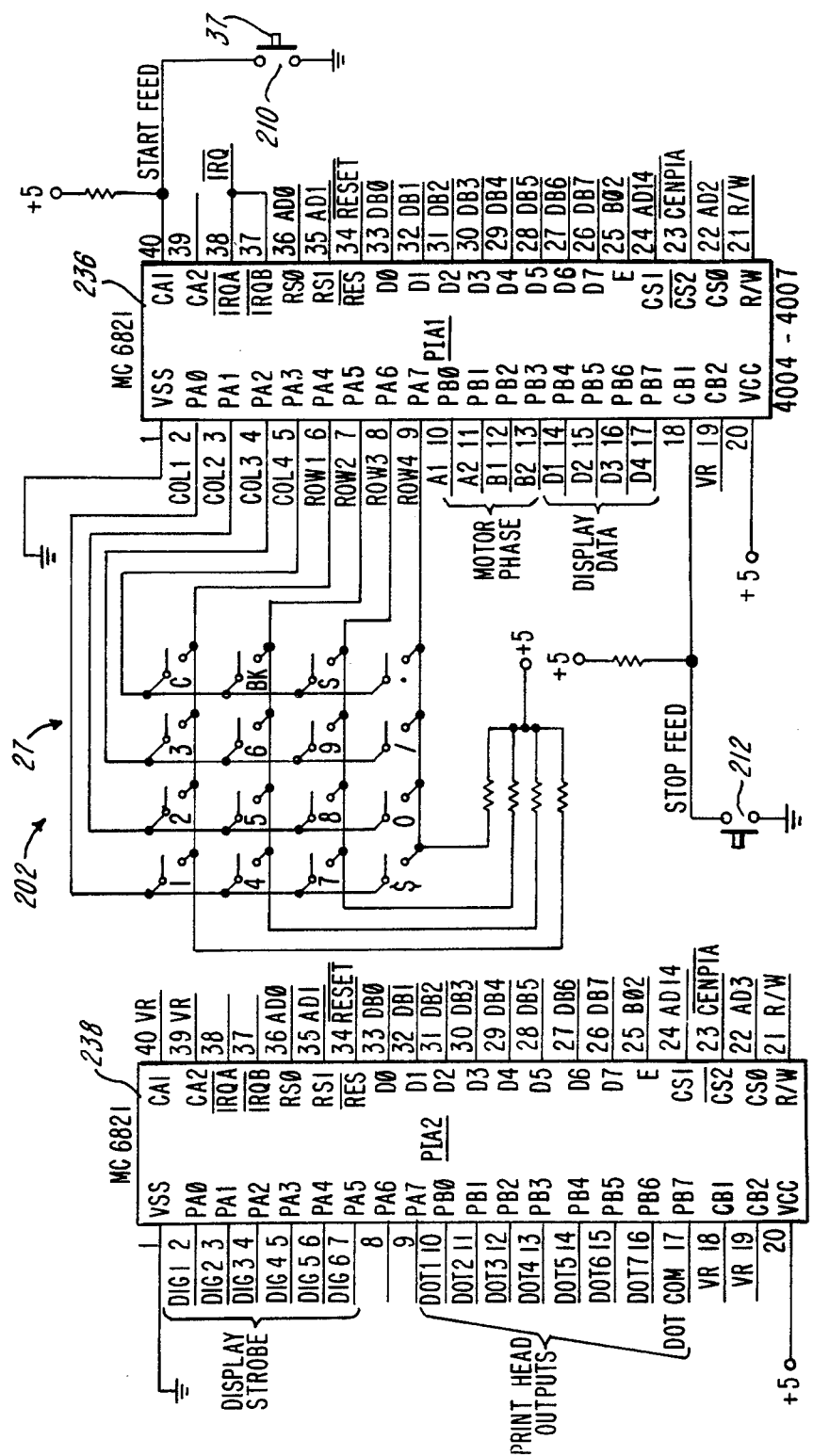

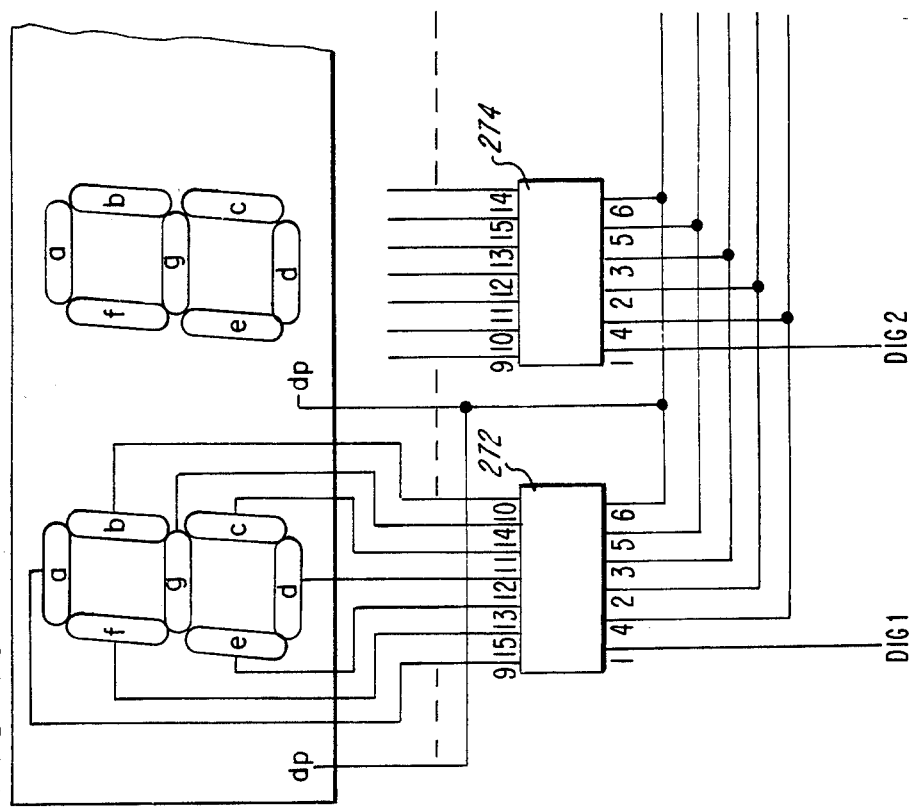
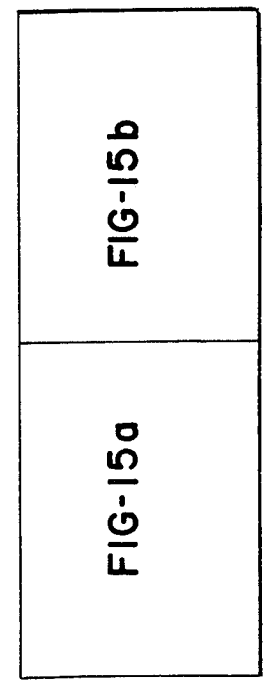
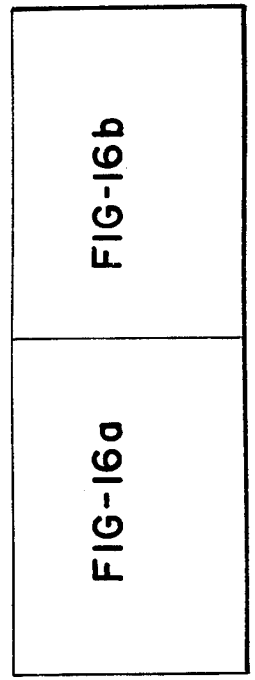

HAND-HELD ELECTRICALLY SELECTABLE LABELER

CROSS REFERENCE TO RELATED APPLICATION

This is a continuation application of copending patent application Ser. No. 268,590, filed on May 29, 1981, now U.S. Pat. No. 4,407,692.

BACKGROUND OF THE INVENTION

1. Field of the Invention

This invention relates to the art of handheld labelers.

2. Brief Description of the Prior Art

A prior art hand-held labeler using thermographic printing means is disclosed in U.S. patent application Ser. No. 928,522, filed July 27, 1978, now U.S. Pat. No. 4,264,396 and corresponding European patent application No. 78300187.8 filed July 21, 1978, published Feb. 7, 1978. Mechanically operated labelers are disclosed in U.S. Pat. No. 3,957,562 granted May 18, 1976 to Paul H. Hamisch, Jr. and U.S. Pat. No. 4,116,747 granted Sept. 26, 1978 to Paul H. Hamisch, Jr. A hand-held labeler with a battery in the handle portion is disclosed in German Patent No. 2,253,565 granted Dec. 16, 1976 to Schroter. Also, various stationary printers utilizing various single and multiple line thermographic print heads are known.

SUMMARY OF THE INVENTION

This invention relates to a hand-held labeler for printing and applying pressure sensitive labels. The labeler has a housing which mounts a label roll. The roll includes a carrier web on which a series of pressure sensitive labels are releasably mounted. Printing is accomplished by a print head comprising an array of individually controllable printing elements disposed in a dot matrix, and preferably arranged in a single line array disposed in a direction transverse to the direction of advancement of the web. The array can be relatively short, i.e., the length or width of a single character, or can extend substantially across the entire printing area of the web. In the latter case, characters of any size, font and orientation can be printed by energizing the individual printing elements in the proper sequence. Each of the individual elements of the array may be directly connected to the circuitry controlling the print head, or a serial-to-parallel converter may be incorporated in the print head to make the elements serially addressable. The use of serially addressable elements has the advantage that it substantially reduces the number of leads needed to interconnect the print head with the control circuitry, particularly if a long array containing a large number of elements is used, and increases the number of individual printing elements that can be provided in a practical system. The time duration of the actuation of the individual printing elements can be made controllable, as is the case when thermographic printing elements are employed, the characters can be made to appear as if they were printed by an array of individual elements, or continuously printed, simply by varying the length of time that the actuators are actuated. Finally, multiple lines of print, disposed either longitudinally or transversely to the direction of elongation of the web can be provided, and such multiple lines can be interspersed with single lines of print of equal or different size characters by appropriate programming of the print head control circuitry.

The invention provides a convenient to use, compact arrangement for a hand-held labeler. The applicator is disposed at the front portion of the housing and the label roll is mounted at a rear portion of the housing. The housing has a section for mounting a keyboard. The keyboard or other input terminal is used to input data to a central microcomputer circuit which in turn controls the printing elements and operates a visual display. In one embodiment, the carrier web is advanced by means of a stepping motor controlled by the microcomputer and coupled to a feed wheel through a speed reducer. In another embodiment, the carrier web is advanced by a manually operable actuator disposed at the handle.

BRIEF DESCRIPTION OF THE DRAWING

FIG. 1 is a perspective view of a hand-held labeler in accordance with one embodiment of the invention;

FIG. 2 is a perspective view of a portion of the labeler showing structure located in the housing;

FIG. 3 is a perspective partially exploded view of a drive mechanism for a toothed feed wheel;

FIG. 4 is a fragmentary sectional view showing the relationship of thermographic printing elements to a platen roller;

FIG. 7 is a perspective, partly phantom view of a labeler similar to the embodiment of FIGS. 1 through 6, but using a manual drive for the carrier web;

FIG. 8 is an exploded, perspective, diagrammatic view showing the drive for the carrier web;

FIG. 9 is a sectional view showing a fluidic drive for driving the feed wheel at a substantially constant rate irrespective of the speed of actuation of a manually operable actuator;

FIG. 10 is a sectional view showing a fragment of the fluidic device;

DETAILED DESCRIPTION OF THE PREFERRED EMBODIMENTS

Figure 5:
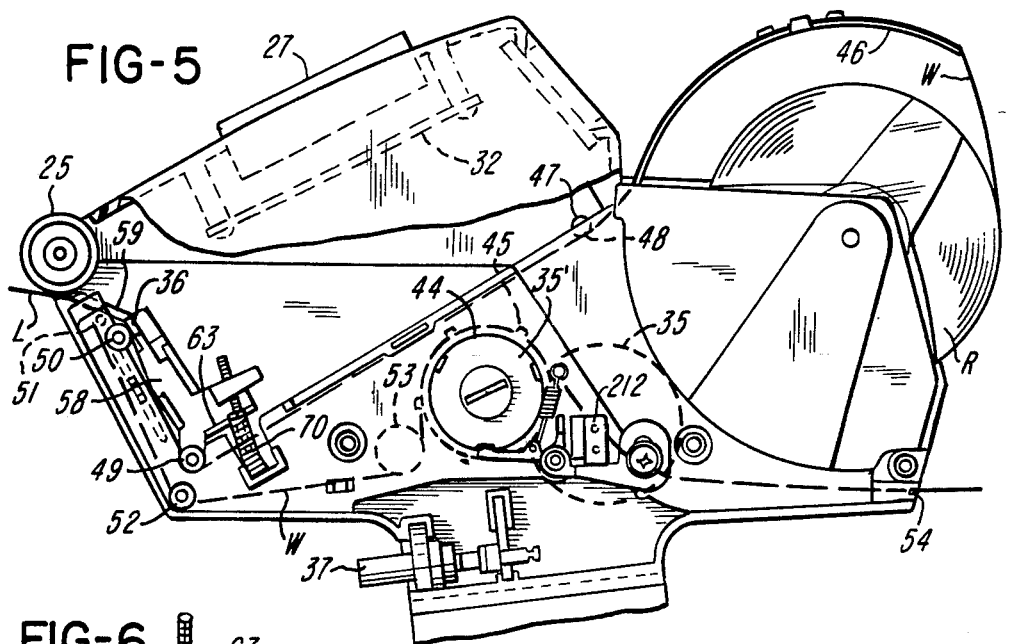
FIG. 5 is a fragmentary, partly broken away, side elevational view of the labeler.

Referring initially to FIG. 1, there is shown a hand-held labeler generally indicated at 20. The labeler 20 includes a housing generally indicated at 21 comprised of housing sections 22 and 23 which define opposite sides of the labeler 20. The housing 21 also includes a movable housing section 24 as shown to be pivotally mounted on the same axis as the label applicator 25 which is shown to comprise a rotatable roll. The housing also includes a handle 26 provided by the outer shell of a rechargeable battery. The handle 26 is removable as shown by phantom lines in FIG. 1. As seen, the applicator 25 is disposed at the front portion of the housing 21 and a label roll R is mounted to a rear portion of the housing 21. A keyboard 27 having a plurality of manually selectable keys 28 is shown to be disposed at a top portion of the housing 21. A visual display 29 is disposed adjacent the keyboard 27 and is shown to face upwardly and rearwardly. More specifically, the keyboard 27 and the display 29 are mounted on the movable section 24 of the housing 21. The movable section 24 can be latched in the closed position by means of latch teeth 30 (FIG. 2) which cooperate with manually movable latches 31 mounted by the respective housing sections 22 and 23. However, the latches 31 are movable to release the movable section 24 so that the movable section 24 can be pivoted to the open position shown in FIG. 2.

With reference to FIG. 2, there is diagrammatically illustrated a printed circit board 32 disposed in underlying relationship with respect to the keyboard 27. The circuit board is shown to be adjacent and generally parallel to the keyboard 27, as also shown in FIG. 5. A flexible, ribbon connector 33 comprised of a suitable number of side-by-side electrical conductors (not shown) is connected to a switch 34, to a stepping motor 35 (FIG. 3), and to a plurality of electrically selectable printing elements 36' disposed on a print head 36. The switch 34 has a switch button 37 disposed at the handle 26 in a position to be operated by the user's index finger. The stepping motor 35 has an output shaft 38 to which a spur gear 39 is secured. The spur gear 39 is a pinion and is relatively small. The spur gear 39 meshes with a relatively large gear 40 to which is secured a relatively small gear 41. The gear 41 is a pinion for a relatively large gear 42. A drive shaft 43 secured to the gear 42 drives a feed wheel 44 having a plurality of peripherally spaced teeth 45. The teeth 45 engage a carrier web W at cuts C to draw the carrier web W and labels L which it carries from the label roll R. As best shown in FIG. 5, the web W is drawn over the roll R and passes over a resilient device 46 to between a brake roll 47 and a brake surface 48, to and partially around a roll 49, to between the printing elements 36 and the platen 50, through a sharp bend about a delaminator 51 where the leading label on the web W is dispensed into label applying relationship with respect to applicator 25, partially around a roll 52, partially around a roll 53, into engagement with the toothed feed wheel 44, and out of the apparatus as indicated at 54. With reference to FIG. 4, it will be noted that in the event there is no carrier web W between the printing elements 36' and the platen 50, flanges or rolls 50' contacting the platen support 58 at locations 50" will prevent the printing elements 36' from contacting the platen roll 50. This will prevent damage to both the platen 50 and to the printing elements 36' which can result from energization of the printing elements 36'. For example, if the labeler 20 has a thermographic print head 36, the printing elements will not burn or fuse onto the platen 50, and the printing elements 36' will not be ruined.

Figure 6:
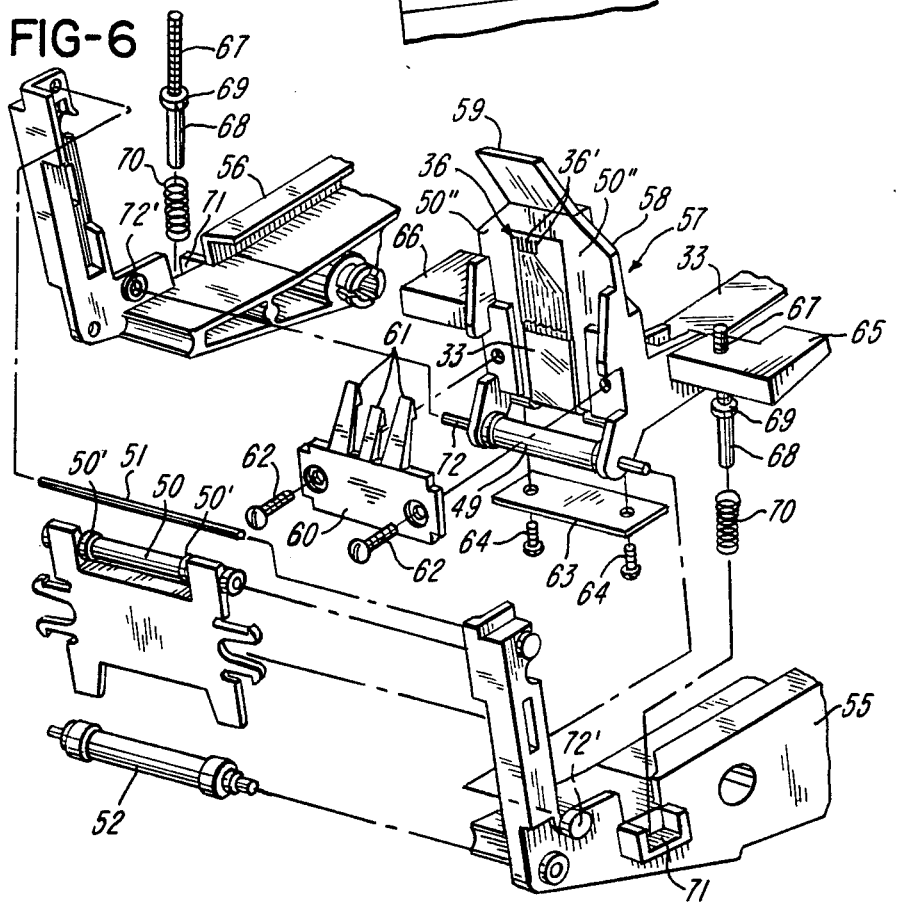
FIG. 6 is an exploded perspective view of a print head assembly and structure to which it is mounted.

With reference to FIG. 6, there are shown fragmentary portions of subframe sections 55 and 56 mounted on the housing 21. The subframe sections mount a platen assembly generally indicated at 57. The subframe sections 55 and 56 also mount the delaminator 51 and the roller 52. The platen assembly 57 includes a support 58 for the print head 36. As shown, the print head 36 includes plurality of separate printing elements 36'. The printing elements 36' are each connected to one of the conductors of the ribbon connector 33 and are separately energizable. Alternatively, a serial-to-parallel converter (not shown) may be mounted adjacent to the head 36 and interposed between the elements 36' and the ribbon connector 33 in order to reduce the number of conductors required in the ribbon connector 33. The use of such a converter is particularly advantageous when a long array containing a large number of elements is used as the print head 36. The labels L are sensitive to heat and the heated area of the label L which a heated printing element 36' contacts will change color, for example, become darker. A deflector 59 guides a delaminated label into label applying relationship with respect to the applicator 25. The support 58 rotatably mounts the roll 49 about which the carrier web W passes. A retainer plate 60 having a plurality of hold-down fingers 61 holds the ribbon connector 33 in position. Screws 62 are threadably received by the support 58. A retainer 63 also holds the ribbon connector 33 in position. Screws 64 are threadably received by the support 58. The support 58 has oppositely extending projections 65 and 66. The respective projections 65 and 66 threadably receive a threaded portion 67 of a pin 68. Each pin 68 has an enlarged portion providing a shoulder 69. A spring 70 nests in a pocket 71 and bears against the respective subframe sections 55 and 56. The other end of the respective spring 70 bears against the shoulder 69 to urge the support 58 and the print head 36 which it carries in the counterclockwise direction. The support 58 is pivotally mounted on a pin 72 which also mounts the roll 49. The pin 72 is received in elongated holes 72' in respective subframe sections 55 and 56. The springs 70 urge the printing elements 36' into contact with the adjacent label L as best shown in FIG. 4. The printing elements 36' exert a selected amount of pressure against the label L in accordance with the adjustment of the threaded pins 68. Because the pin 72 is undersize with respect to the holes 72 in which it is received, the support 58 and the print head 36 can skew with repect to the platen 50. As shown, the printing elements 36' are arranged in a line which extends transversely to the direction of movement of the carrier web W. If, for example, either end portion of the line of printing elements 36 is bearing too heavily against the label L, the respective threaded pin 68 adjacent that end can be turned to reduce the spring pressure. It is a feature of the invention to be able to skew the support 58 by adjusting means which are disposed at spaced apart locations. Both housing sections 22 and 23 have enlarged cutouts or holes 75 into which the projections 65 and 66 respectively project. The projections 65 and 66 extend far enough so that they can be easily actuated by the user. During threading of the labeler 20, the carrier web W is passed along the path illustrated in FIG. 5. When the leading end of the carrier web W is in position to be passed between the print head 36 and the platen 50, the user pushes on the projections 65 and 66 to pivot the support clockwise as viewed in FIGS. 5 and 6 to move the printing elements 36' away from the platen 50. In this way the leading end of the carrier W can be pushed through the space between the printing elements 36' and the platen 50. If desired, the print head 36 can be fixedly held in position and the platen 50 can be selectably moved toward and away from the print head 36 by an alternative construction, not shown. When the threading of the labeler is complete, the projections 65 and 66 can be released whereupon the springs 70 urge the support 58 and the print head 36 counterclockwise to their normal position as shown in FIGS. 4 and 5.

With reference to the embodiment of FIGS. 7 through 10, there is shown a labeler 20A identical to the labeler 20 except as described below. The labeler 20A uses a drive for advancing the carrier web W which is manually powered. The handle 74 mounts a pivot 75 for a manually engageable lever actuator 76. The lever actuator 76 carries a gear section 77 which meshes with a gear 78. The gear 78 carries a pawl 79 which cooperates with a ratchet wheel 80 secured to the feed wheel 44. The ratchet wheel 80 is shown to have a plurality of teeth 81 with which a pawl 79 cooperates. A fluidic device generally indicated at 82 is shown to be disposed in the handle 74 and bears against the handle 74 and the actuator or lever 76. The fluidic device 82 includes a tubular cylinder 83 having a closed end portion 84 and a tubular piston 85 having a closed end portion 86. The cylinder 83 and the piston 85 have respective integrally formed bearings 87 and 88 in contact with bearing surfaces 89 and 90 of the handle 90 of the handle 74 and the lever 76, respectively. The cylinder 83 has an internal flange 91, and the piston 85 has an external flange 92 to limit separational movement. A resilient O-ring 93 is disposed between the piston 85 and the cylinder 83 to provide an air seal therebetween. The cylinder 83 and the piston 85 combine to provide a chamber 94. A compression-type drive spring 95 is disposed in the chamber 94 and bears against respective end portions 84 and 86 of the cylinder 83 and the piston 85. The drive spring 95 can be located outside the chamber according to another embodiment, if desired. The end portion 84 contains a restricted orifice 96 and the end portion 86 contains an opening 97 which is alternately opened and closed by means of a valve 98. The construction of the valve 98 and the end portion 86 are shown in greater detail in FIG. 10. The valve 98 is of the flapper type and has an anchor portion 99 anchored in a recess 100. The valve 98 has a flexible resilient portion 101. The opening 97 has a tapered entry 102 for receiving the valve 98. The opening 97 is considerably larger than the restricted orifice 96. When it is desired to operate the labeler 20A, the user squeezes the lever 76 to cause the piston 85 to telescope into the cylinder 83 and compress the drive spring 95, thereby causing air within the chamber 94 to pass outwardly through the orifice 96 and the opening 97, and the fluidic device 82 provides essentially no fluid resistance because air can readily escape from the chamber 94. Essentially all of the resistance is afforded by the spring 95. When the lever 76 is released the spring 95 acts on the lever 76 to drive the gear 98 and in turn the ratchet wheel 80 and the feed wheel 44 at an essentially constant rate. It is noted that upon release of the lever 76, the valve 98 closes so that the only air entering the chamber 94 is through the restricted orifice 96. Accordingly, the fluidic device 82 moves from its distended position to its extended position at a controlled, essentially constant rate. Accordingly, the feed wheel 44 is driven at an essentially constant rate. Printing on the labels L takes place while the carrier web W and the label L which it carries are advancing through the labeler 28. To accommodate for variations in the angular velocity of the feed wheel 44, a shaft encoder generally indicated at 103 is provided. The shaft encoder 103 includes a plurality of markings 104 on the feed wheel 44 and a pickup device or sensor 105.

Figure 11:
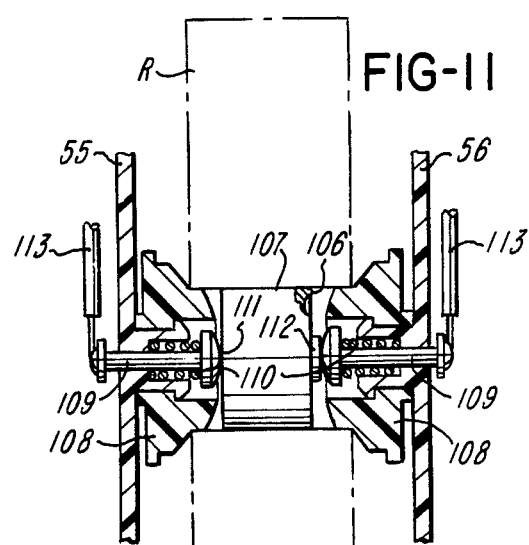
FIG. 11 is a sectional view showing the manner in which a label roll and a battery which it carries are mounted in the labeler.

Because the labeler 20A does not rely on battery energy to advance the carrier W, the battery used to energize the printing elements 36' can be relatively small. According to the invention, a battery 107 is positioned in a central hole 106 in the label roll R as best shown in FIG. 11. It is preferred that the battery 107 fit snugly in the label roll hole 106. As shown, the frame sections 55 and 56 rotatably mount roll mounting members 108. Electrical contacts generally indicated at 109 are suitably mounted within the mounting members 108 and are urged by respective springs 110 into contact with opposed terminals 111 and 112 of the battery 107. Electrical energy from the battery 107 is passed from the contacts 109 to conductors 113 and to the ribbon connector 33 to the circuit board 32. The battery 107 can be part and parcel of the label roll R in which event the battery 107 would fit snugly in the label hole 106.

Figure 12:
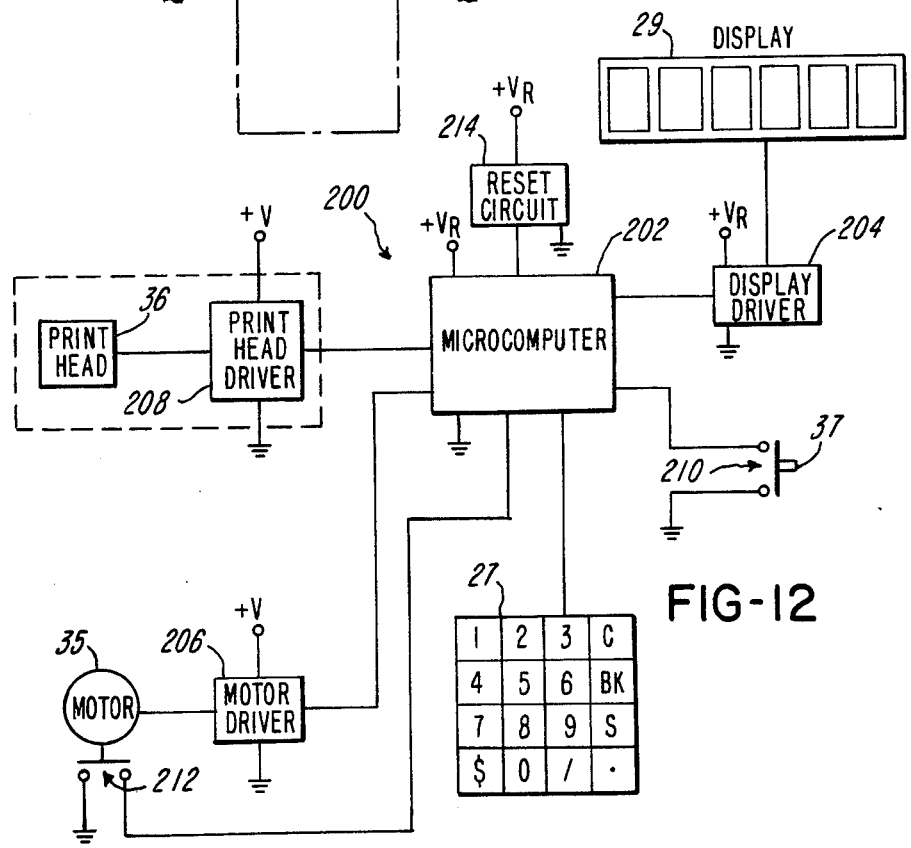
FIG. 12 is a functional block diagram of the electronic control circuitry of the labeler according to the invention.

Referring now to FIG. 12, there is shown the interrelationship between many of the previously described mechanical and electromechanical portions of the labeler such as the keyboard 27, the display 29, the stepping motor 35, the print head 36, the trigger 37 and the control circuitry, which is responsive to inputs from the keyboard 27 and the trigger 37 and serves to control the display 29, the stepping motor 35 and the print head 36. The control circuitry is generally designated by the reference numeral 200 in FIG. 12, and comprises a microcomputer 202 which includes a central processing unit, a read-only memory and a random-access memory (not shown in FIG. 12 but described in a subsequent portion of the application) which cooperate to perform the functions required to receive data from the keyboard 27 and provide the required computations to drive the display 29, the stepping motor 35 and the print head 36 in accordance with the instructions received from the keyboard 27. The control signals from the microcomputer 202 that drive the display 29 are applied to a display driver 204 and are processed thereby to convert the data from the microcomputer 202 to segment driving data that activate predetermined segments of the display 29. A motor driver 206 is responsive to step data from the microcomputer 202 and serves to energize various windings of the stepping motor 35 in a predetermined sequence in response to the step data in order to cause the motor 35 to rotate. A print head driver 208 provides power to the individual elements of the print head 36. The print head driver may be simply a plurality of amplifiers, one for each element, which amplify signals from the microcomputer 202, or may include a serial-to-parallel converter that converts serial digital data from the microcomputer 202 to parallel data for driving each of the individual elements of the print head 36. When a serial-to-parallel converter is employed, the print head driver 208 is preferably located on the same hybrid circuit board as the print head 36 in order to substantially reduce the number of leads required between the microcomputer 202 and the assembly containing the print head 36. This substantial reduction is achieved because each element of the print head 36 must have an individual lead connected thereto, and if the print head driver 208 contained only amplifiers, or if it were not located on the same circuit board as the print head 36, the cable interconnecting the print head circuit board and the microcomputer would require a lead for each element. Since several hundred elements can be contained in the print head, it would not be practical to build such a cable. However, by including a serial-to-parallel converter in the print head driver, and by locating the print head driver 208 on the same hybrid circuit board as the print head 36, only that number of leads required to supply the required data at the desired printing rate need be provided.

A switch 210 is controlled by the trigger 37 and causes the microcomputer 202 to advance the stepping motor 35 in order to cause the motor 35 to feed the web whenever the trigger 37 is depressed. A stop feed switch 212, which may be controlled, for example, by a cam 35' driven by the motor 35, or by a notch or the like in the web, is coupled to the microcomputer 202 and serves to terminate the advancement of the web after the web has been advanced a predetermined amount, generally the length or width of a label. A reset circuit 214 is coupled to the source of power for the labeler, such as, for example, the output of the regulated voltage which powers the control circuitry, resets the microcomputer 202 each time the power is turned on to assure that no extraneous data is present in the microcomputer 202 prior to the entry of any data by the keyboard 27.

In operation, data to be printed is entered into the microcomputer 202 manually via the keyboard 27, or automatically from another computer or data output source, such as, for example, a cassette recorder (not shown). The entered data may be numeric, alphanumeric and may be of various fonts and sizes, depending on the complexity of the program stored in the microcomputer 202. For example, if the data were entered from the keyboard 27, any of the digits 0 through 9 could be entered, as well as a dollar sign, slash and period. Also, with an appropriate program, the font can be changed to larger or block letters, for example, by depressing the BK key on the keyboard 27. Spaces can be entered by depressing the S key, and the memory can be cleared in the event of an error by depressing the C key. Also, different fonts can be entered by depressing various combinations of keys, for example, by simultaneously pressing the BK and $ keys prior to or while entering data if the microcomputer 202 is programmed to recognize such combinations.

Each line of entered data is displayed on the display 29 as it is being entered, and if two lines of data are being entered, the display is cleared after the entry of the first line so that the second line can be displayed. Once the input data has been correctly entered, as evidenced by the display 29, any number of labels can be printed by depressing the trigger 37 to close the switch 210. The closing of the switch 210 causes the microcomputer 202 to energize the motor 35 via the motor driver 206, and to maintain the motor 35 energized until the switch 212 is closed, for example, by a notch or other indexing mark on the web, or by a cam 35' or the like driven by the motor 35 which indicates that a complete label has been printed. The motor is then deenergized, and the printing will stop until the trigger 37 is depressed again.

During the time that the motor 35 is being driven by the microcomputer 202, the various elements in the print head 36 are energized by the microcomputer 202 via the print head driver 208 in the sequence necessary to cause the input data to be printed in the desired font. The data from the microcomputer 202 is applied to the print head driver 208 in parallel or serial form, preferably in serial form, in which case the print head driver converts the input information into parallel form for simultaneously energizing all of the elements in the line array that need to be energized in order to define one line of the array forming the character or characters being printed.

Figures 13A, 13B, 13C, 13D:
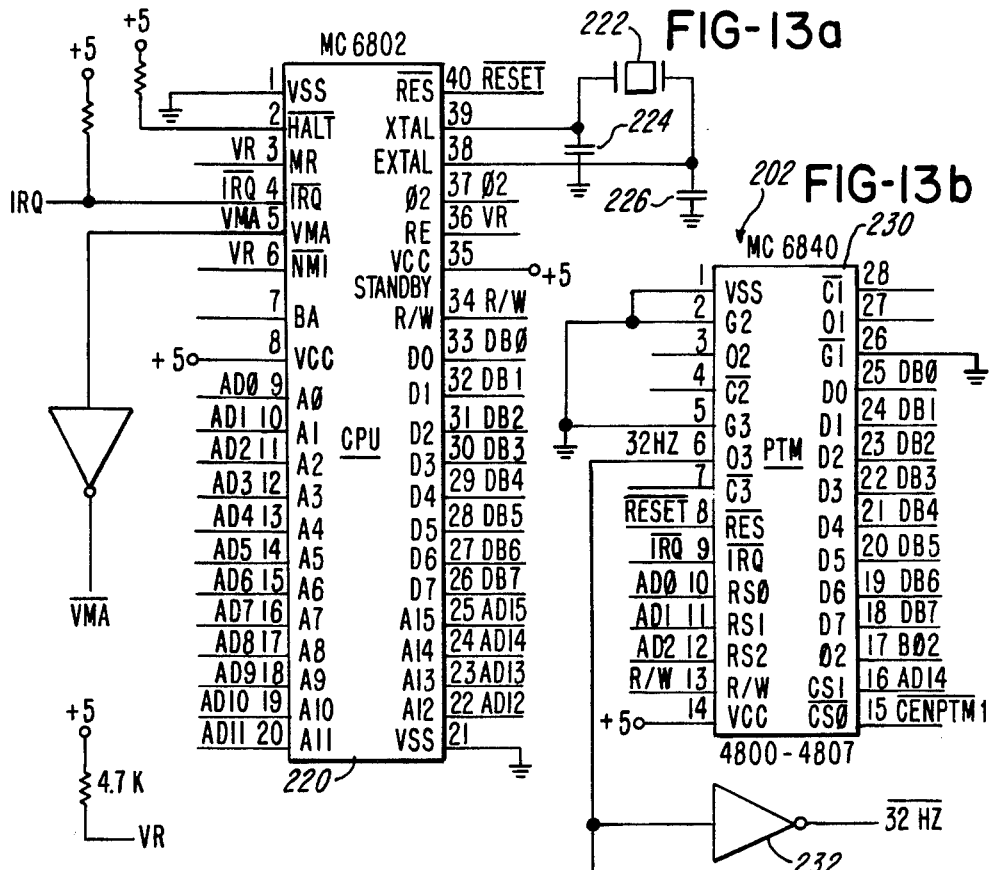
FIG. 13 is a schematic diagram of the microcomputer utilized in the labeler.

The microcomputer 202 of FIG. 12 is illustrated in greater detail in FIG. 13. The microcomputer 202 can take on many different configurations, and a typical configuration is illustrated in FIG. 13. In the circuit illustrated in FIG. 13, the microcomputer 202 contains a central processing unit (CPU) 220 which contains, in the present embodiment, an onboard random-access memory (RAM) having a capacity of 128 bytes, as well as an internal clock whose frequency is controlled by a quartz crystal 222 and a pair of capacitors 224 and 226. In the present embodiment, an MC 6802 integrated circuit manufactured by Motorola, Incorporated, is used as the central processing unit 220; however, many similar integrated circuits manufactured by other manufacturers are available.

A read-only memory (ROM) 228 is used in conjunction with the central processing unit 220. The read-only memory 228 serves to store various data such as the program that controls the operation of the CPU 220, various data, format data, error checking data, and various miscellaneous data necessary to assure proper operation of the labeler. As in the case of the central processing unit 220, various circuits suitable for use as the read-only memory 228 are available, but in the present embodiment, a type 2716 read-only memory, which is capable of storing 16,000 bits of information, or 2,000 words of 8 bits each, is used as the read-only memory 228. The capacity of the read-only memory 228 may be either increased or reduced as necessary, depending on the number of functions desired of the labeling machine, and the number of fonts and formats required. The type 2716 read-only memory illustrated in FIG. 13 is manufactured by Motorola, Incorporated, Texas Instruments and other manufacturers.

The microcomputer 202 also contains a programmable timer module (PTM) 230 which operates in conjunction with the CPU 220 and provides various timing signals, such as, for example, timing signals for controlling the time duration that the thermographic printing elements are energized, as well as a 32 Hz signal (and a 32 Hz inverted signal from the inverting amplifier 232) necessary for the operation of the display driver 204. In addition, a 3 to 8 bit demultiplexer 234, which may be a 74 LS 138 demultiplexer available from various manufacturers, as well as a pair of peripheral interface adapters (PIA's) 236 and 238, which may be, for example, a type MC 6821 peripheral interface adapter available from various manufacturers, are also employed. The function of the 3 to 8 bit demultiplexer 234 is to select small portions of the memory 228 for further processing by the CPU 220, and the peripheral interface adapters 236 and 238 serve to provide an interface between the various peripheral elements of the labeling machine, such as, for example, the keyboard 27, the start feed trigger 37, the stop feed switch 212, as well as the print head driver 208 and display driver 204.

In the schematic diagram illustrated in FIG. 13, most of the connections to the various integrated circuits are designated by three different designations, namely, by the pin number of the integrated circuit package, by the integrated circuit manufacturer's mnemonic designation, and by an interconnection designation which defines the interconnections between the various integrated circuits. In the diagram of FIG. 13, the pin number designations are shown above each lead to each integrated circuit, and are positioned just outside of the blocks that represent each of the integrated circuits. Typical pin designations range from 1 through 16 for an integrated circuit requiring relatively few connections, such as the demultiplexer 234 to a range of 1 through 40 for integrated circuits requiring more connections, such as the CPU 220 and the peripheral interface adaptors 236 and 238. The manufacturer's mnemonics are placed adjacent to the pin numbers inside the various blocks representing the various integrated circuits, and serve generally to identify the various functions performed. For example, mnemonics beginning with a prefix A indicate address bits and mnemonics beginning with the prefix D indicate data bits. Finally, the interconnection designations are placed adjacent the pin numbers outside of the various blocks defining the various integrated circuits. These interconnection designations are also mnemonic in form, and if the same interconnection designation is present on leads extending from two or more different integrated circuits, it indicates that those leads are interconnected. Using this convention in a specific example, the lead designated AD 0 on the CPU 220 would be connected to the leads designated AD 0 on the ROM 228, the PIA1 236 and the PIA2 238.

In operation, data is entered into the CPU 220 from the keyboard 27 via the PIA1 236. The PIA1 236 is sensitive to interconnections between the terminals designated as COL1 through COL4 and ROW1 through ROW4 to determine which of the switches of the keyboard 27 have been closed by a depression of the corresponding keys during the entry of data. The data thus entered is converted by the PIA1 236 to display data at outputs D1 through D4 for driving the display driver 204, as well as to data usable by the CPU 220 appearing at the outputs DB0 through DB7 of the PIA1 236. The entered data is also applied to the PTM 230, as well as to the PIA2 238 which receives the entered data (after processing by the CPU 220) and drives various elements of the print head 36 corresponding to outputs DOT1 through DOT7 of the PIA2 238. The PIA2 238 also sequentially strobes the six digits of the display via the outputs DIG1 through DIG6.

In addition, the PIA1 236 drives the motor driver 206 by applying motor phase signals A1, A2, and B1, B2 sequentially to the motor driver 206 whenever the switch 210 is closed by depressing the trigger 37. The drive signals continue to be generated until the sensing switch 212 is closed by an index mark on the web, or otherwise.

Figure 14:
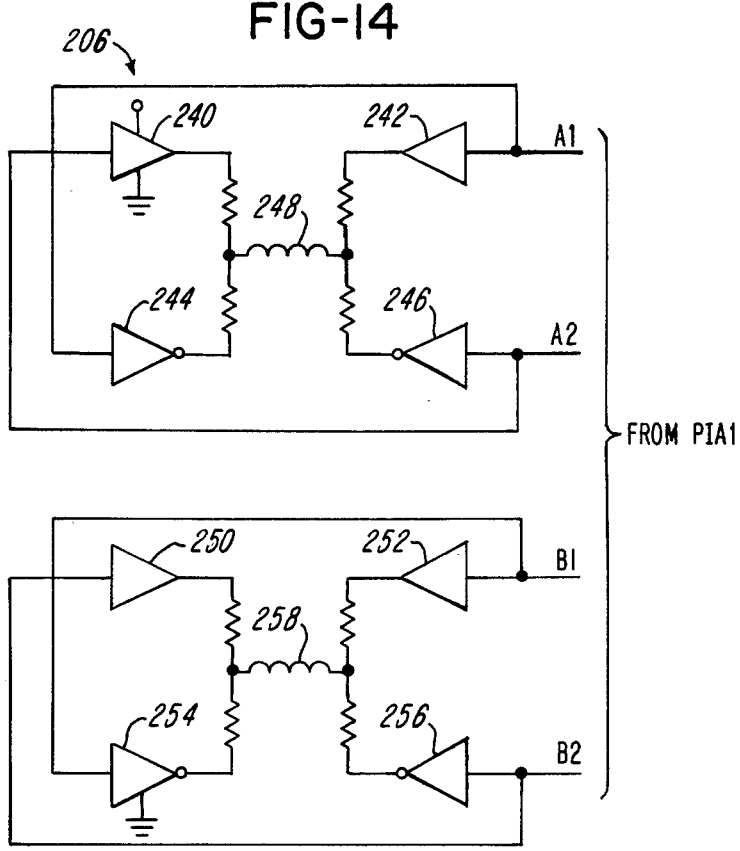
FIG. 14 is a schematic diagram of a stepper motor driver usable in conjunction with the present invention.

The motor driver 206 is illustrated in greater detail in FIG. 14, and comprises four amplifier drivers 240, 242, 244 and 246, which drive one winding 248 of the stepper motor 35, and four amplifier drivers 250, 252, 254 and 256, which drive a second winding 258 of the motor 35. The motor driver 206 is responsive to the A1, A2, and B1, B2 signals from the PIA1 236 and serves alternatively to energize the windings 248 and 258 in opposite directions depending upon which one of the signals A1, A2, or B1, B2 is present, and causes the motor to be advanced one step each time the signal present at A1, A2, B1, or B2 is stepped.

In the embodiment illustrated in FIG. 13, each of the DOT1 through DOT7 outputs from the PIA2 238 drives a single printing element of the print head 36. Such a system is acceptable as long as the number of individually actuable printing elements remains relatively small, as in the case of the seven elements driven by the outputs DOT1 through DOT7. However, if a print head having a substantially larger number of individually selectable printing elements is required, the number of leads required between the PIA2 238 and the print head 36 can rapidly become excessive. For example, if the print head 236 contains two-hundred fifty-six individually addressable elements, two-hundred fifty-six individual leads would be required to interconnect the print head 36 and the PIA2 238 if the system of FIG. 13 were employed. This would result in a highly impractical structure. Therefore, in order to avoid this problem, and in accordance with another important aspect of the present invention, the PIA2 238 is replaced with the circuitry of FIG. 15, generally designated by the reference numeral 238', which drives the circuitry and thermal elements located on a thick film substrate 239 which may be a thick film print head of the type manufactured by the R.ohm Corporation of Irvine, Calif.

Figure 15A:
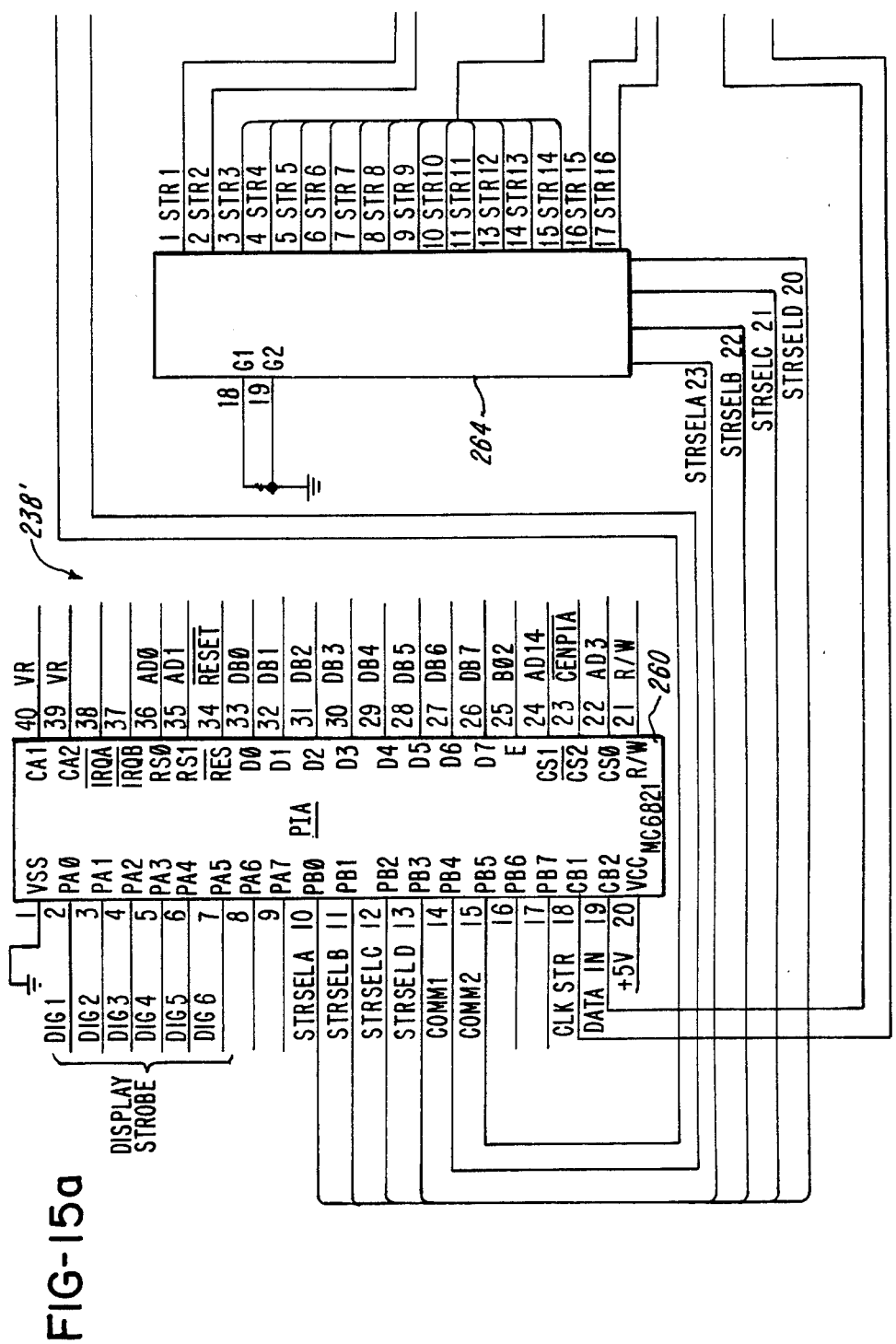
FIG. 15 is a schematic diagram of a thermographic print head and control circuitry usable in one embodiment of the invention.

In the embodiment illustrated in FIG. 15, a PIA 260 receives data representative of the character to be printed from the CPU 220 via the data lines DB0 through DB7. The data thus received is converted to serial form and appears at the output of the PIA 260 designated as DATA IN. In addition, common signals designated as COMM1 and COMM2, as well as strobe signals STRSELA through STRSELD, whose function will be described in a subsequent portion of the specification, are generated. The DATA IN signals are applied to a shift register 262 (located on the substrate 239) which stores the serial data, and the COMM1 and COMM2 signals are applied to alternate printing elements of the thermographic printing head 36 (also located on the substrate 239). The STRSELA through STRSELD signals are applied to a 4 to 16 bit demultiplexer 264, which may be a type 74154 demultiplexer manufactured by various manufacturers.

In the embodiment illustrated in FIG. 15, the print head 36 is also located on the substrate 239 and contains two-hundred fifty-six individual printing elements connected to a one-hundred twenty-eight stage shift register (located on the substrate 239) via one-hundred twenty-eight drivers which, in the present embodiment, are one-hundred twenty-eight AND gates (also located on the substrate 239).

The two-hundred fifty-six printing elements 36' are connected to two common lines, namely, the lines designated as COMM1 and COMM2 by two-hundred fifty-six diodes 270 (located on the substrate 239). One-hundred twenty-eight of the diodes 270 are connected to the common line COMM1 and the one-hundred twenty-eight diodes 270 are connected to the common line COMM2. Each of the AND gates 266 is connected to a pair of adjacent resistive thermal printing elements, and each element of each pair of adjacent printing elements is connected to a different one of the lines COMM1 and COMM2 via one of the diodes 270. Thus, a single one of each pair of adjacent printing elements can be selected by addressing both elements of the pair via the appropriate AND gate 266, and energizing one of the common lines COMM1 or COMM2 to determine which printing element of the pair is to be energized.

As a result of the use of the two common lines COMM1 and COMM2, the shift register 262 need have only one-hundred twenty-eight stages rather than two-hundred fifty-six, or one-half the number of printing elements. The data for the one-hundred twenty-eight printing elements associated with the common line COMM1 is first loaded into the shift register 262 via the DATA IN line, and the common line COMM1 is energized in order to energize the one-hundred twenty-eight printing elements associated with the common line COMM1 in accordance with the data stored in the shift register 262 at that time. Subsequently, data for the one-hundred twenty-eight printing elements connected to the common line COMM2 is loaded into the shift register 262 via the DATA IN line, and the common line COMM2 is energized in order to energize various ones of the printing elements associated with the common line COMM2 in accordance with the data now stored in the shift register 262. Thus, by loading the data into the shift register 262 in two passes and alternately energizing one-half of the two-hundred fifty-six print elements of the print head 36, the number of stages in the shift register 262 can be reduced by a factor of two.

The previous discussion assumed that all of the AND gates 266 were continuously enabled, and as a result, would transfer the contents of the shift register 262 independently of any other inputs applied to the AND gates 266. Such a system is readily workable and can be achieved simply by making the second input of each of the AND gates 266 high. However, under certain circumstances, particularly as in the case of a hand held labeler, the battery power available to drive the print head 36 is limited. Consequently, it is not desirable to drive as many as one-half of the total number of print elements at any one time since this requires a substantial amount of peak battery power. Consequently, the AND gates 266 are strobed in sixteen strobes STR1 through STR16, in the present embodiment, under the control of the strobe signals STRSCLA through STRSCLD. As a result, no more than eight printing elements are energized at any one time, thus providing a substantial reduction in peak power requirements. Thus, in the embodiment illustrated in FIG. 15, the data for one-hundred twenty-eight printing elements is first stored in the shift register 262, and the AND gates 66 are strobed sequentially, eight at a time, in a sixteen strobe sequence until all one-hundred twenty-eight of the AND gates 266 have been strobed. Then the data for the second one-hundred twenty-eight printing elements is loaded into the shift register 262, and the AND gates 266 are again sequentially strobed to energize the second group of printing elements. Although, the embodiment illustrated in FIG. 15 uses a sixteen strobe sequence, it should be understood that any number of strobes may be used in the sequence, and if more battery or other peak power is available, a shorter sequence wherein a greater number of the AND gates 266 are simultaneoulsy strobed during each strobe may be used.

Figure 15B:
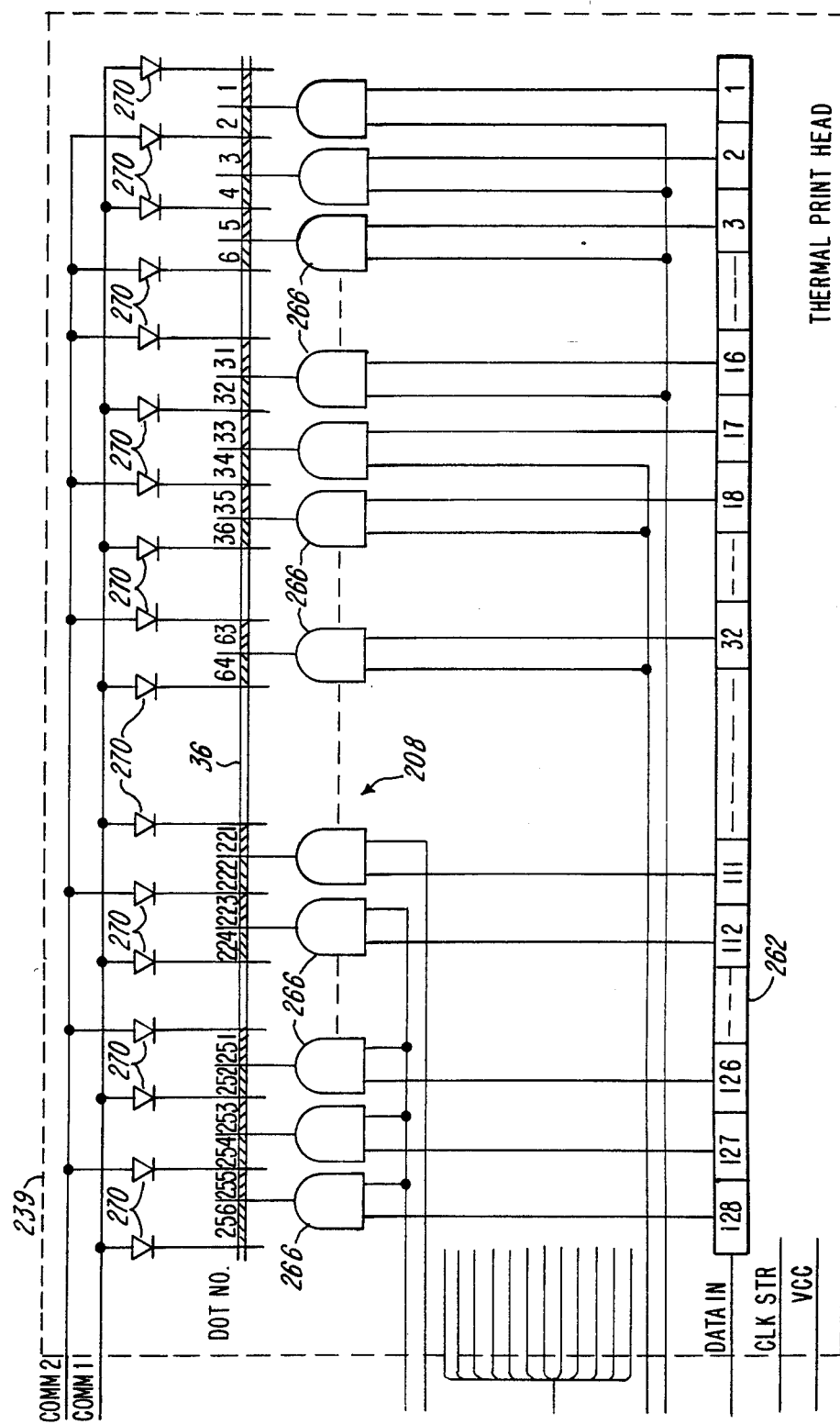

In the illustrated embodiment, the individual printing elements 36' are aligned in a straight line array disposed in a direction substantially perpendicular to the direction of travel of the carrier web W; however, the printing elements 36' may be arranged in various patterns, and the print head 36 may be skewed with respect to the direction of travel of the web W, depending on practical design considerations and intended use. For example, a single line array of the type illustrated in FIG. 15B provides a great deal of format flexibility, and permits virtually any character or symbol to be printed, depending on the sophistication of the microprocessor 220, its associated components and programming. If only a few characters of a particular type are required, the single line array may be skewed or even curved to accomodate the particular type of characters being printed, and thus permit a reduction in the complexity of the microprocessor 220 and its associated circuitry and programming. Also, for other applications, it may be desired to use a multiple line printing head, a matrix, or even to offset alternate ones of the printing elements 36 in the direction of travel of the web W to compensate for web movement during the interval between energization of the lines COMM1 and COMM2. If the printing elements are energized sequentially, the line may be skewed to compensate for web movement.

Figure 16B:
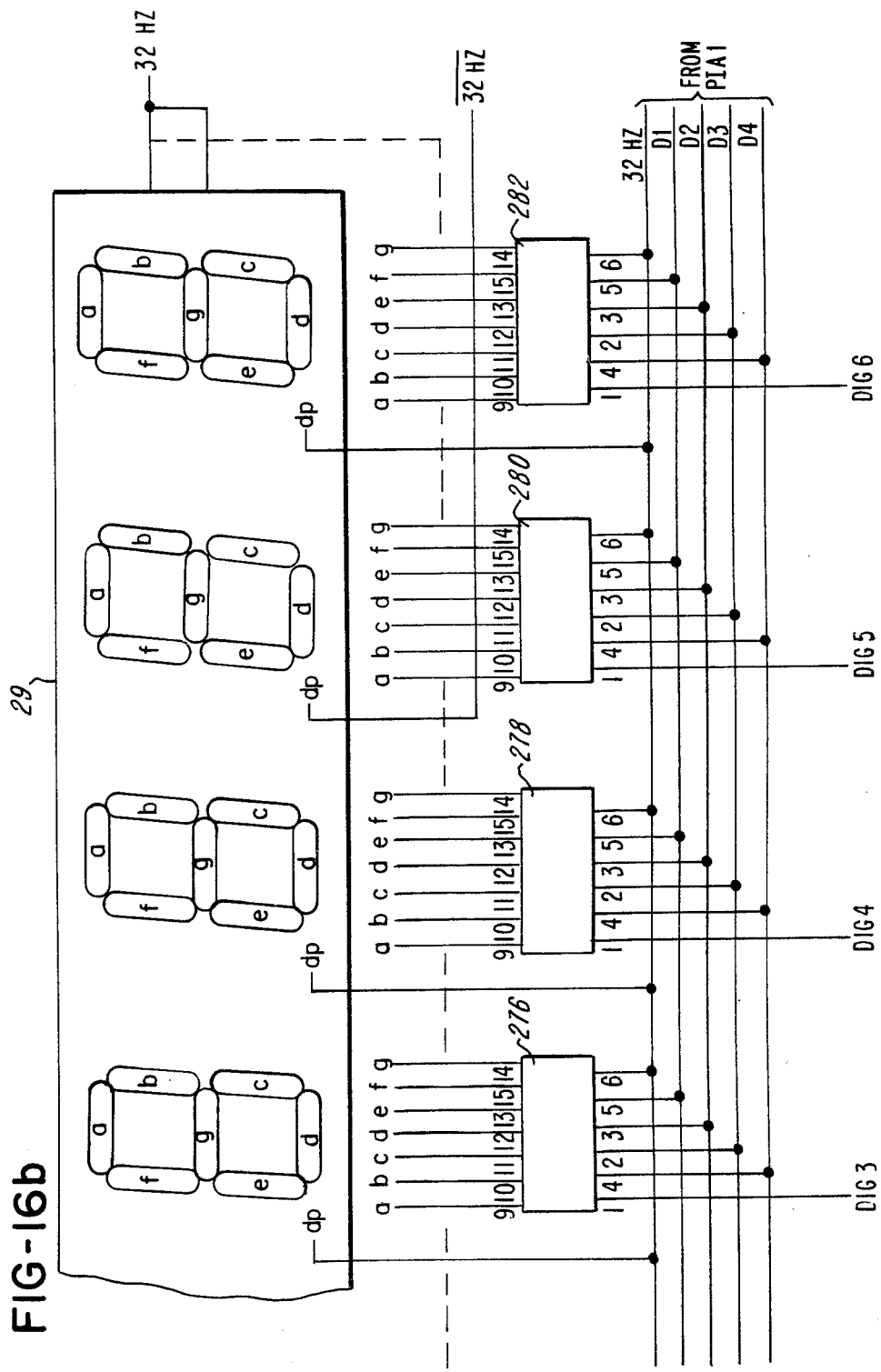
FIG. 16 is a schematic diagram of a visual display and display driver usable in conjunction with the present invention.

The display driver 204 and the display 29 are illustrated in greater detail in FIG. 16. As is illustrated in FIG. 16, the display 29, in the present embodiment, consists of six individual seven-segment displays, which may be, for example, light emitting diode displays, liquid crystal displays or the like. In addition, if alpha characters are required in addition to the numeric characters, additional segments may be provided. Decimal points are also provided between the digits of the display.

The driver 204 comprises six converter drivers 272, 274, 276, 278, 280 and 282. In the illustrated embodiment, type 4056 converters, manufactured by RCA and other manufacturers, are used as the converters 272, 274, 276, 278, 280 and 282; however, any converter suitable for converting a four-bit digit defining word to a seven-bit word for illuminating various segments of the display may be used.

Each of the converter drivers 272, 274, 276, 278, 280 and 282 has four inputs D1 through D4 that are connected to the PIA1 236 and receive digit defining data from the PIA1 236. In addition, each of the converter drivers 272, 274, 276, 278, 280 and 282 has an input connected to one of the display strobe outputs DIG1 through DIG6 of the PIA2 238. A 32 Hz clock signal is also applied to the display as well as to the converter drivers 272, 274, 276, 278, 280 and 282. The seven outputs of each of the converter drivers 272, 274, 276, 278, 280 and 282 are connected to the seven segments of each of the digits of the display, designated as segments a through g on each of the digits and on the outputs of the converter drivers 272, 274, 276, 278, 280 and 282.

In operation, the digit defining information is presented to all of the converter drivers 272, 274, 276, 278, 280 and 282 via the inputs D1 through D4. The data defining the digits is presented sequentially, in synchronism with strobe signals that are applied to the converter drivers 272, 274, 276, 278, 280 and 282 via the inputs DIG1 through DIG6. Thus, when data defining the first digit is applied to the inputs D1 through D4, the strobe DIG1 goes low and causes the converter driver 272 to read the data on the lines D1 through D4 defining the first digit. Similarly, data defining the second through sixth digits is presented on the lines D1 through D4 in synchronism with the respective strobes DIG2 through DIG6 to cause the various converter drivers 274, 276, 278, 280 and 282 to read the respective digit data on the lines D1 through D4 at the time they are strobed. Once the digit data has been read by the converter drivers 272, 274, 276, 278, 280 and 282, the appropriate ones of the segments a through g of the various digits are illuminated to generate the required display.

Since the display illustrated in FIG. 16 is designed to display price information, all of the decimal points, except for decimal points associated with the fifth digit are connected to the 32 Hz clock signal to prevent them from being illuminated. Conversely, the decimal point associated with the fifth digit is connected to an out-of-phase 32 Hz signal to render it permanently illuminated. However, if a permanently illuminated decimal point between the dollars and cents digits of the display is not desired, illumination of various decimal points can be controlled by the microprocessor via one of the peripheral interface adapters to provide selective illumination of the various decimal points.

Figure 17:
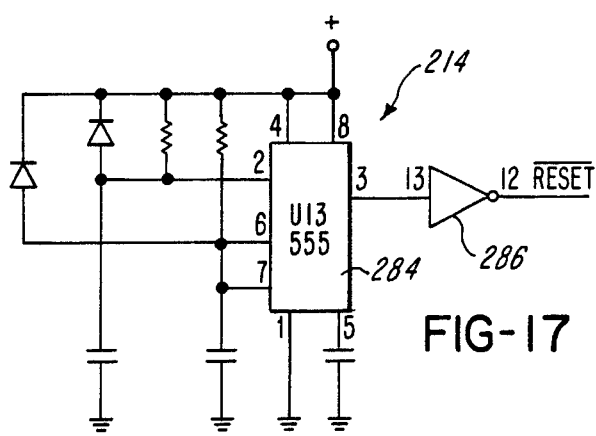
FIG. 17 is a schematic diagram of a reset circuit for the microcomputer utilized in the present invention.

The reset circuit 214 is illustrated in greater detail in FIG. 17, and in the embodiment illustrated in FIG. 17, a type 555 timer circuit and an amplifier 286 are used to provide a reset pulse to the circuitry after power is first applied to the circuit. Although the reset circuit illustrated in FIG. 17 employs a timer and amplifier, any suitable reset circuit that provides a reset pulse after turn on to the CPU 222, the PTM 230, and the PIAs 236 and 238 may be utilized.

Figure 18:
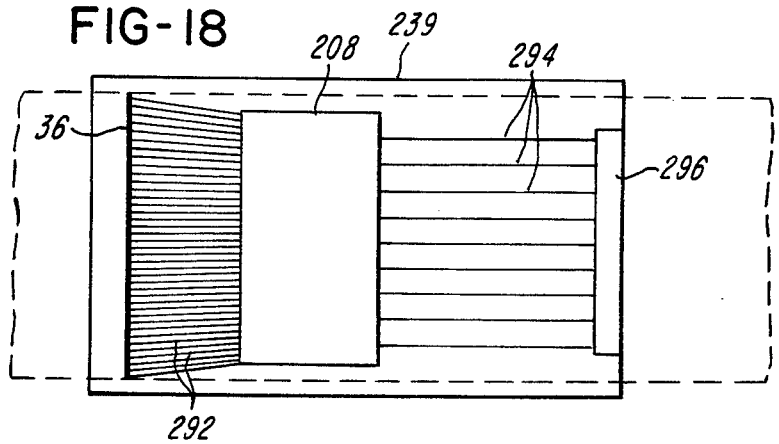
FIGS. 18 and 19 are illustrations of two different thermographic print heads usable in conjunction with the present invention.

Referring now to FIG. 18, there is shown a typical physical layout for the print head and driver circuitry illustrated schematically in FIG. 15. As illustrated in FIG. 18, the print head 36 is located on the substrate 239, and the print head driver circuitry is fabricated from one or more integrated circuits 208 also located on the substrate 239. Interconnections between the integrated driver circuitry 208 and the individual print elements are made by a plurality of thick film metallic conductors 292 deposited on the substrate 239 by vapor deposition or other hybrid or thick film circuit techniques. The conductors 292 correspond to the interconnections between the AND gates 266 and the print head 36 (FIG. 15), and if a print head having two-hundred fifty-six individual elements and two common lines, such as the lines COMM1 and COMM2, is utilized, the number of individual conductors 292 may be as few as one-hundred thirty, one-hundred twenty-eight to provide the interconnections between the individual printing elements and the AND gates 266 plus two to serve as the common lines COMM1 and COMM2. The inputs to the driver circuitry 208 may be provided by a plurality of conductors 294, similar to the conductors 292. The conductors 292 serve to apply the DATA IN signal as well as the various strobe signals and common signals to the integrated circuit driver circuitry 208. A connector 296 provides an electrical connection between the conductors 294 and the ribbon connector 33 (FIG. 6). Since it is no longer necessary to provide a direct connection between the microprocessor and each of the individually addressable printing elements when a serial-to-parallel converter is used, the number of conductors 294 and the number of conductors in the ribbon connector 33 may be substantially reduced.

Figure 19:
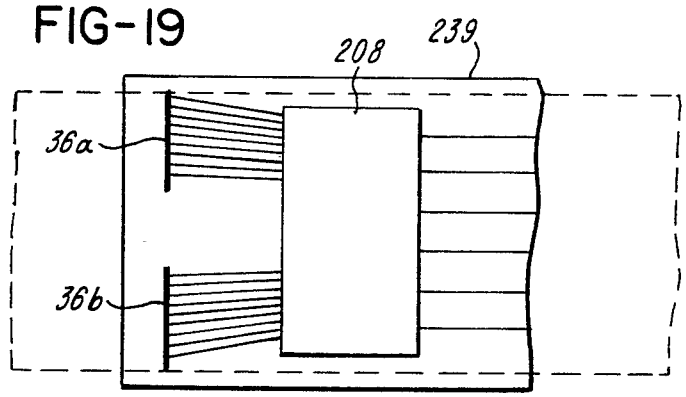
Figure 20:
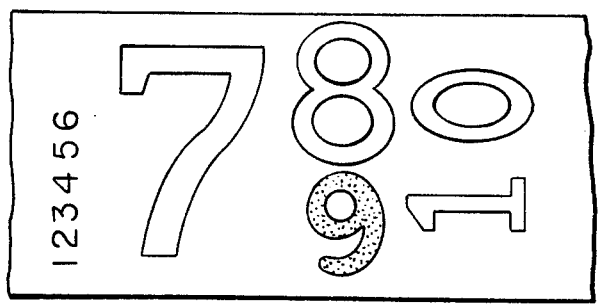
FIG. 20 is an illustration of various types of characters that can be printed by the labeling machine according to the present invention.

In the embodiment illustrated in FIG. 18, the individual printing elements of the print head 36 are disposed on a single straight line that is disposed in a direction substantially perpendicular to the direction of advancement of the web carrying the labels (shown in dashed lines in FIG. 18). By making the length of the print head 36 at least equal to the width of the label web, printing can be made to occur on any area of the web, thereby permitting any size characters that can be accommodated by the web to be printed. In addition, reverse, or negative, characters wherein the background is darkened and the characters are light (unprinted) can also be printed utilizing the configuration of FIG. 18. Also, by appropriate programming of the microprocessor characters of various fonts and sizes, as well as various orientations, for example, perpendicular to or parallel to the direction of advancement of the web. Skew characters can also be printed. Also, by appropriate programming, or by utilizing a print head having two spaced groups of printing elements, such as the groups 36a and 36b (FIG. 19), certain areas of the web may be reserved as blank areas. Also, by appropriate programming or by utilizing two spaced groups of printing elements, two sets of identical labels can be simultaneously printed on a double width web. These labels can subsequently be separated, either by cutting, or by tearing if a perforated web is utilized. FIG. 20 shows few of the various types of characters that can be printed by the labeler according to the present invention, but it should be understood that many other characters including alpha and numeric characters, including script and non-standard characters, as well as designs can be printed.

Figure 21:
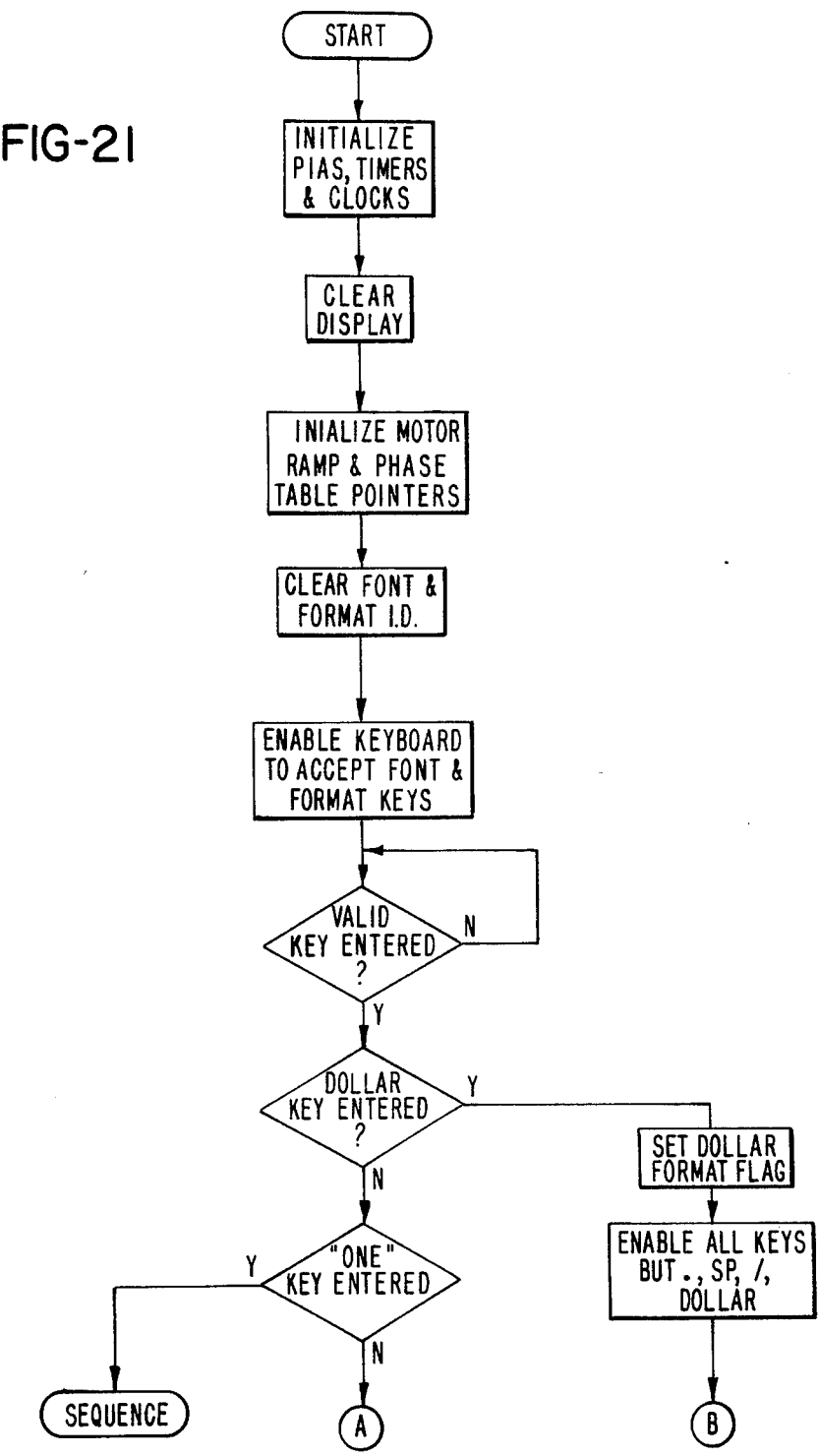
FIGS. 21-26 are logical flow diagrams describing the logical sequence of operations performed by the microcomputer during data input and label printing operations.
Figure 22:
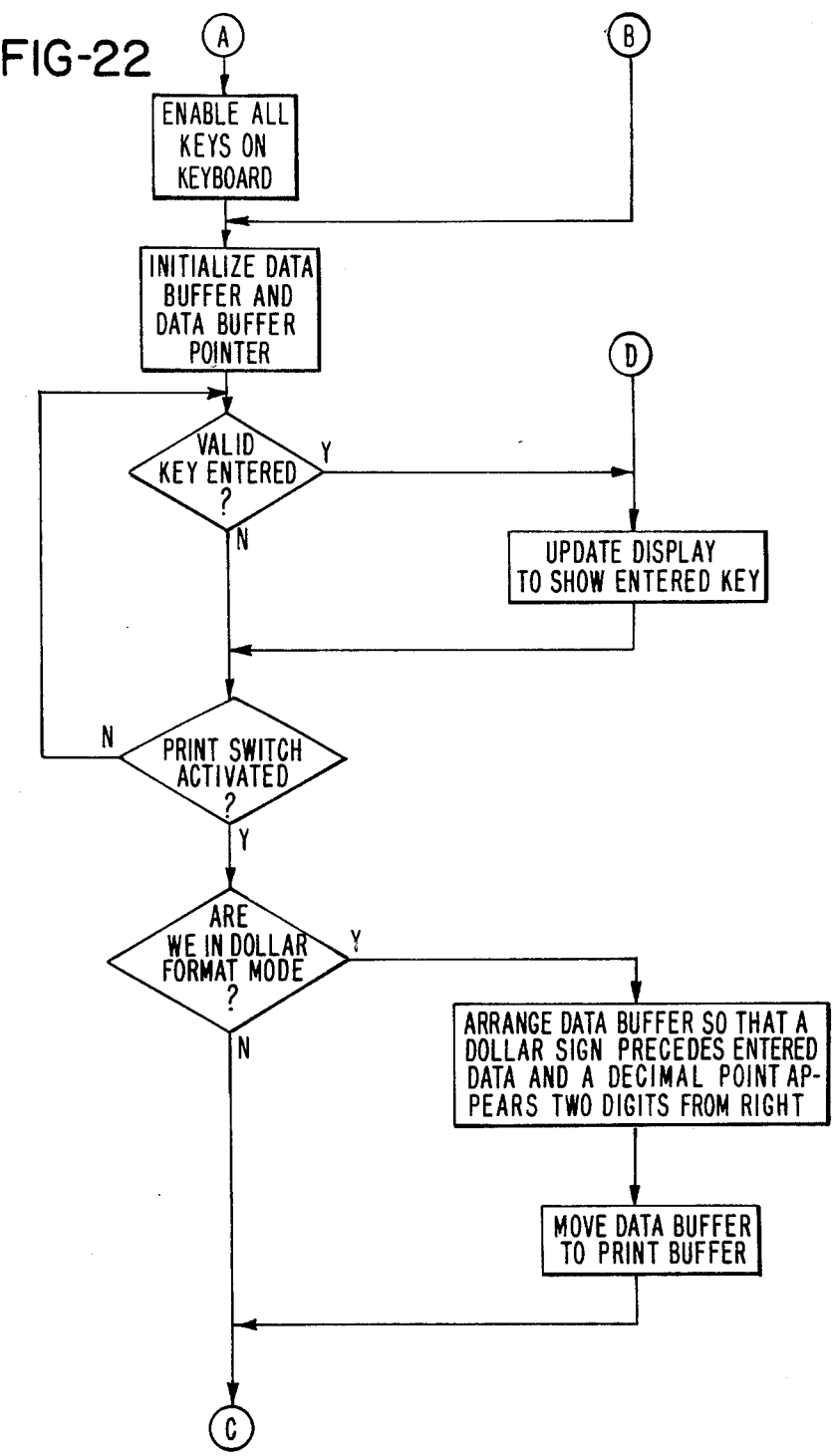

FIGS. 21-26 illustrate the various logical sequences followed by the logic circuits during the entry and printing of data. FIGS. 21 and 22 illustrate the initialization routine wherein the various timers, clocks, registers, etc. are cleared prior to the entry of new data. In addition, FIG. 21 illustrates the font and/or format selection process along with some error checking wherein the font and/or format is selected by entering, via the keyboard or otherwise, data to identify the font and/or format selected. In addition, the program determines whether the data entered represents a valid font or format, and restricts the data that may be entered once the format has been selected. For example, if the dollar format has been selected, only numbers preceded by a dollar sign and having a decimal point between the dollars and cents figures may be entered and printed. If less restrictive formats are selected, any form of data may be entered. Also, the VALID KEY ENTERED block of FIG. 22 may incorporate various error checking logic, such as, for example, logic permitting only certain characters to be placed in a certain field, check digit logic, and logic requiring the data to be entered twice for verification purposes.

Figures 23, 26:
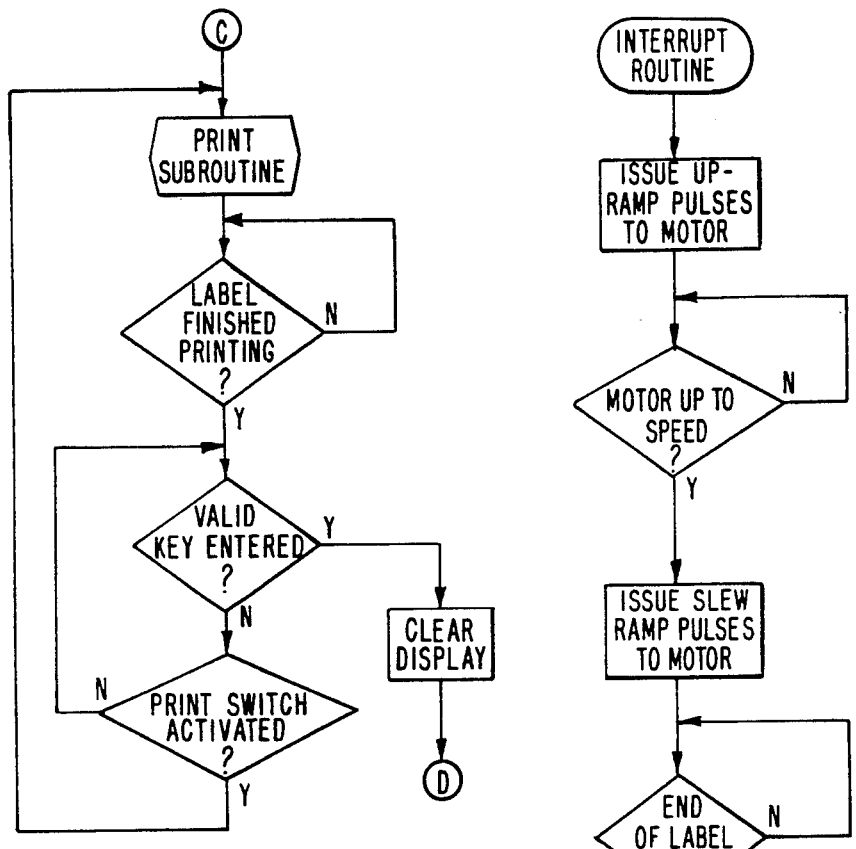
Figure 25:
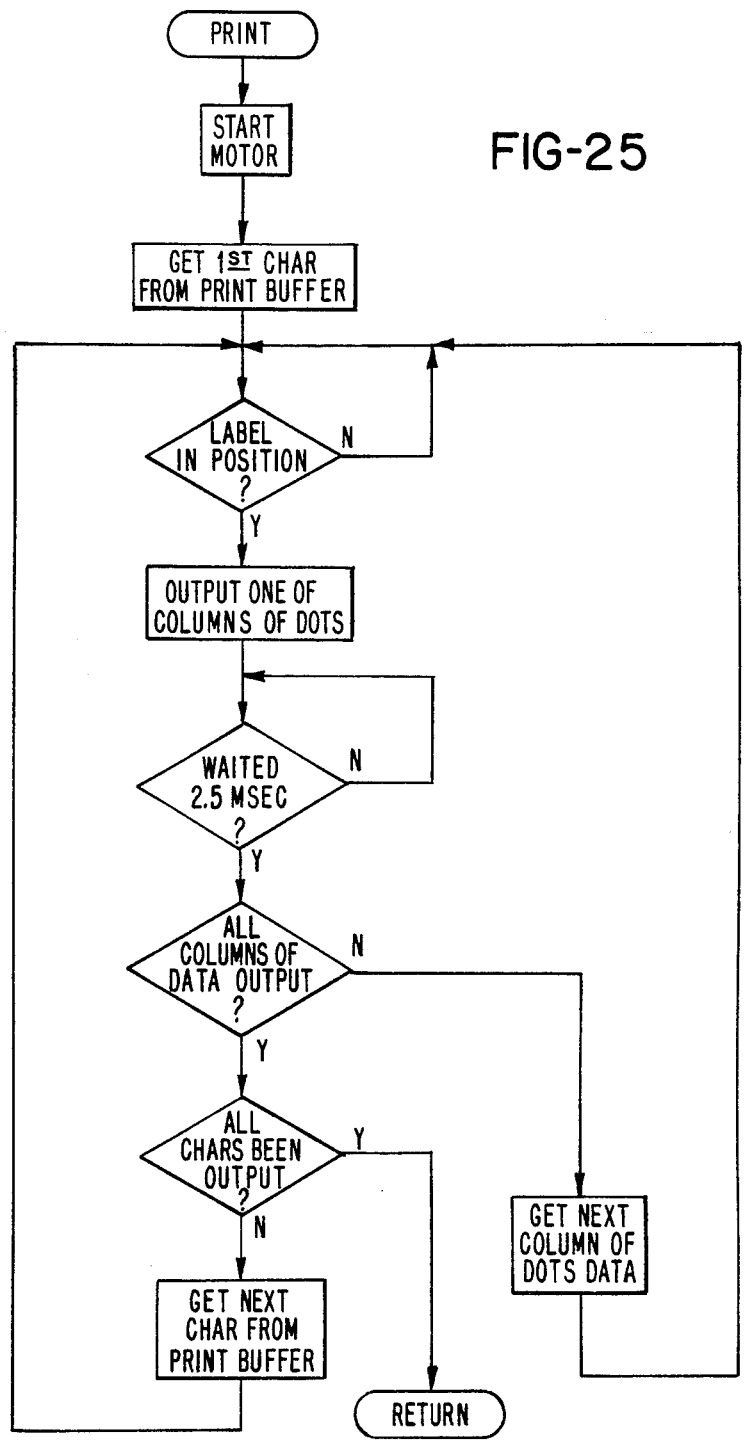

FIG. 23, in conjunction with the print subroutine of FIG. 25, illustrates the printing process. In the printing process, the stepping motor is started in order to advance the web, and the characters, in the selected font and format, are taken from the print buffer. The data defining each column forming the selected characaters is sequentially applied to the print head to form the selected characters on a column-by-column basis as the web is advanced. During the printing process, the length of time that each print element is maintained energized may also be adjusted depending on the size of the character being printed, and whether a continuously printed character, or a character wherein the individual imprints are visible, is desired. When the printing of a first character has been completed, the next character (or characters, when more than one character is being printed across the width of the web) is withdrawn from the print buffer and the process is repeated until all of the entered characters have been printed.

Figure 24:
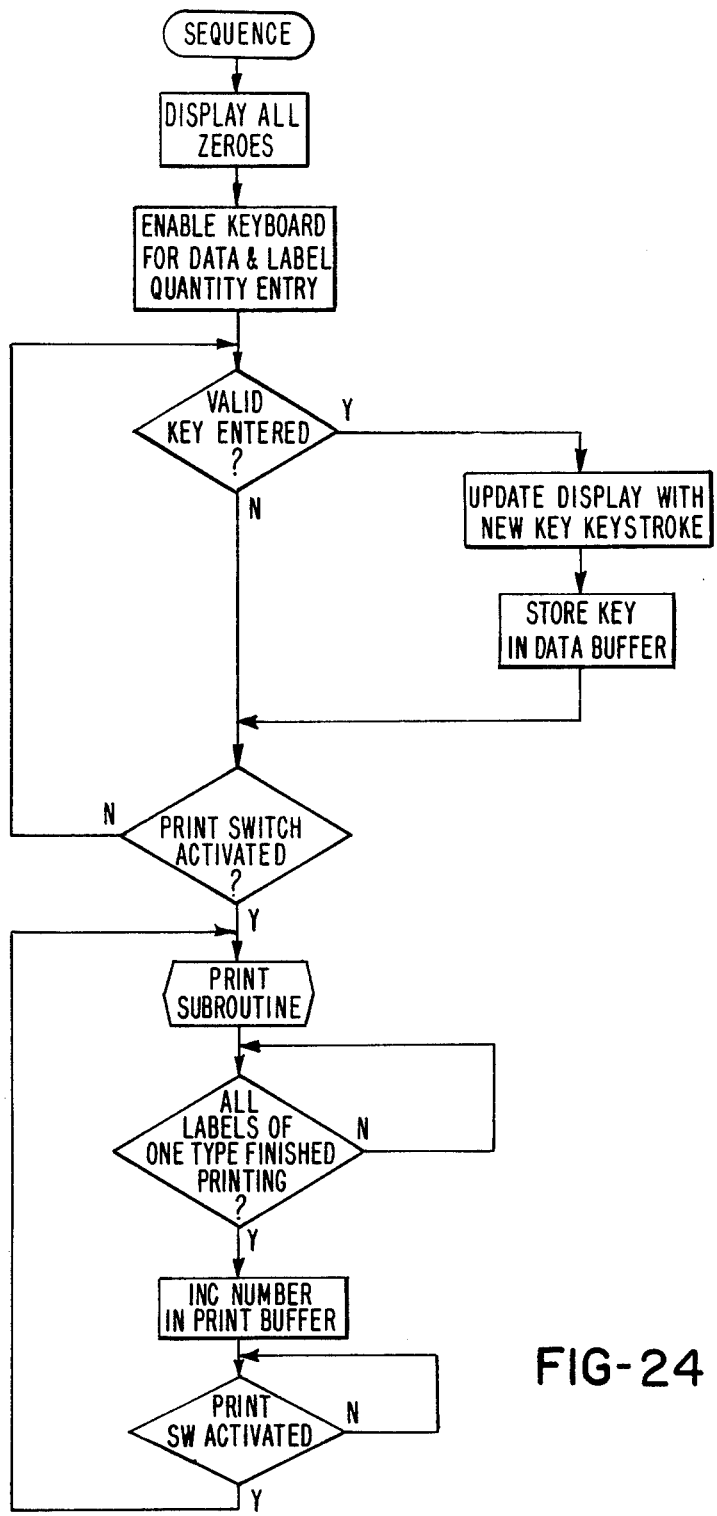

FIG. 24 illustrates a typical logic sequence that would be employed if a series of labels having a predetermined numeric or alphanumeric sequence were desired. As illustrated in FIG. 24, the keyboard is first enabled to receive data defining the first label as well as data defining the increment between successive labels (and possibly the number of increments required or the data defining the last label). In addition, data defining the quantity of each label required may be entered. Once the data has been entered and the print switch activated, the print routine is started to cause a label to be printed. After a label has been printed, a determination is made to see if all required labels of one type have been printed. If not, the print subroutine is continued until all have been printed. After all labels of one type have been printed, the number or character in the print buffer is incremented (or decremented) by the previously entered increment (or decrement). The routine then pauses until the print switch is again activated whereupon the required number of labels containing the incremented (or decremented) characters are printed.

FIG. 26 illustrates the logical sequence employed for the controlling of the web advancing stepping motor. Basically, the logic gradually slews the motor up to speed as the printing sequence begins, maintains the motor operating at relatively constant speed until the end of the label is reached, as indicated by a notch or the like in the web or otherwise, and gradually slows the motor to a stop after the end of the label has been sensed.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A hand-held labelling machine comprising; a housing having a manually engageable handle, the housing having means for holding a label supply roll of a composite web having labels releasably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, means responsive to the data entering means for storing the selected data, means for storing data defining a print format, the printing means including a thermographic print head having a plurality of individually selectable print elements for printing on a thermographic label at the printing position, means coupled to said data storing means for electrically processing the selected data and energizing the individual print elements in a predetermined sequence determined by the selected data to print data on the label, wherein said advancing means includes signalling means electrically coupled to said processing means for providing a signal representative of the position of a label relative to the print head, said processing means being responsive to said position representative signal and to said format defining data for rendering said print head operative to print the selected data on printable fields of the label defined by the format defining means.

2. A hand-held labelling machine as recited in claim 1 wherein said format data defining means includes means for restricting the data that may be entered to a predetermined set of valid characters defined by the format.

3. A hand-held labelling machine as recited in claim 1 further including manually operable means cooperating with said advancing means and said processing means for causing said advancing means to advance said label and to cause said processing means to energize the individual print elements to print the selected data in accordance with the defined format upon the operation of said manually operable means.

4. A hand-held labelling machine as recited in claim 1 wherein said advancing means is operative continuously to advance the web during the printing of the data.

5. A hand-held labelling machine as recited in claim 4 wherein said processing means includes error checking means for checking the data received from said data entering means.

6. A hand-held labelling machine as recited in claim 5 wherein said error checking means includes means for storing format data and means for comparing data entered by the data entry means with the defined format data and enabling the data entered to be printed only if the entered data has a predetermined relationship to the format data.

7. A hand-held labelling machine as recited in claim 1 wherein said processing means includes means for storing data representative of various fonts of said characters.

8. A hand-held labelling machine as recited in claim 7 wherein said processing means includes means for storing data representative of various sizes of said characters.

9. A hand-held labelling machine as recited in claim 1 wherein said processing means includes means for receiving the data and operating the elements in said thermographic print head to print out the data in any predetermined font and format.

10. A hand-held labelling machine as recited in claim 1 wherein said individually selectable print elements are disposed in an array having a density of approximately 200 elements per inch.

11. A hand-held labelling machine as recited in claim 10 wherein said array is a straight line array disposed transverse to the direction of advancement of the web.

12. A hand-held labelling machine comprising; a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, the printing means including a thermographic print head having a plurality of individually selectable print elements for printing on a thermographic label at the printing position, means coupled to said data entering means for electrically processing the selected data and energizing the individual print elements in a predetermined sequence determined by the selected data to print data on the label, manually operable means coupled to the processing means and to the advancing means, said manually operable means being operative to cause the advancing means to initiate the feeding of the web past the print position and to cause the processing means to operate the thermographic printing head to print the selected data on the label while the web is advancing.

13. A hand-held labelling machine comprising; a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, the printing means including a thermographic print head having a plurality of individually selectable print elements for printing on a thermographic label at the printing position, means coupled to said data entering means for electrically processing the selected data and energizing the individual print elements in a predetermined sequence determined by the selected data to print data on the label, manually operable means coupled to the processing means and to the advancing means, said manually operable means being operative to cause the advancing means to initiate the feeding of the web past the print position and to cause the processing means to operate the thermographic printing head to print the selected data on the label while the web is advancing, said processing means further including means defining a print format, wherein the format defining means, the manually operable means, the advancing means and the processing means cooperate to cause the advancing means to advance the label and to cause the processing means to energize the individual print elements to print the selected data while the web is advancing in accordance with the defined format upon the operation of said manually operable means.

14. A hand-held labelling machine comprising; a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, the printing means including a thermographic print head having a plurality of individually selectable print elements for printing on a thermographic label at the printing position, means coupled to said data entering means for electrically processing the selected data and energizing the individual print elements in a predetermined sequence determined by the selected data to print data on the label, manually operable means coupled to the processing means and to the advancing means, said manually operable means being operative to cause the advancing means to initiate the feeding of the web past the print position and to cause the processing means to operate the thermographic printing head to print the selected data on the label while the web is advancing, wherein said processing means includes error checking means for checking the data received from said data entering means.

15. A hand-held labelling machine comprising; a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, the printing means including a thermographic print head having a plurality of individually selectable print elements for printing on a thermographic label at the printing position, means coupled to said data entering means for electrically processing the selected data and energizing the individual print elements in a predetermined sequence determined by the selected data to print data on the label, manually operable means coupled to the processing means and to the advancing means, said manually operable means being operative to cause the advancing means to initiate the feeding of the web past the print position and to cause the processing means to operate the thermographic printing head to print the selected data on the label while the web is advancing, wherein said processing means includes means for storing data representative of various fonts of said characters.

16. A hand-held labelling machine comprising; a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, the printing means including a thermographic print head having a plurality of individually selectable print elements for printing on a thermographic label at the printing position, means coupled to said data entering means for electrically processing the selected data and energizing the individual print elements in a predetermined sequence determined by the selected data to print data on the label, manually operable means coupled to the processing means and to the advancing means, said manually operable means being operative to cause the advancing means to initiate the feeding of the web past the print position and to cause the processing means to operate the thermographic printing head to print the selected data on the label while the web is advancing, wherein said processing means includes means for receiving the data and operating the elements in said thermographic print head to print out the data in any predetermined font and format.

17. A hand-held labelling machine comprising; a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, the printing means including a thermographic print head having a plurality of individually selectable print elements for printing on a thermographic label at the printing position, means coupled to said data entering means for electrically processing the selected data and energizing the individual print elements in a predetermined sequence determined by the selected data to print data on the label, manually operable means coupled to the processing means and to the advancing means, said manually operable means being operative to cause the advancing means to initiate the feeding of the web past the print position and to cause the processing means to operate the thermographic printing head to print the selected data on the label while the web is advancing, and means electrically coupling the processing means and the thermographic print head, said coupling means including a pluralilty of individual conductors electrically interconnecting the print head and the processing means, the number of said individual conductors being fewer than the number of individually selectable printing elements forming said printing head, said electrical coupling means including a serial-to-parallel converter interposed between said thermographic printing head and said plurality of individual conductors.

18. A hand-held labelling machine comprising; a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means for entering selected data to be printed, the printing means including a thermographic print head having a plurality of individually selectable print elements for printing on a thermographic label at the printing position, means coupled to said data entering means for electrically processing the selected data and energizing the individual print elements in a predetermined sequence determined by the selected data to print data on the label, manually operable means coupled to the processing means and to the advancing means, said manually operable means being operative to cause the advancing means to initiate the feeding of the web past the print position and to cause the processing means to operate the thermographic printing head to print the selected data on the label while the web is advancing, wherein said processing means includes font and format defining means for receiving the data and operating the elements in said thermographic print head to print out the data in any predetermined font and format and error checking means for checking the data received from said data entering means.

19. A hand-held labelling machine as recited in claim 12 wherein said individually selectable print elements are disposed in an array having a density of approximately 200 elements per inch.

20. A hand-held labelling machine as recited in claim 19 wherein said array is a straight line array disposed transverse to the direction of advancement of the web.

21. A hand-held labelling machine as recited in claim 14 wherein said format defining means includes means for storing format data, and said error checking means includes means for comparing the selected data from the data entry means with the stored format data and enabling the selected data entered to be printed only if the selected data has a predetermined relationship to the format data.

22. A hand-held labelling machine as recited in claim 15 wherein said processing means includes means for storing data representative of various sizes of such for characters.

23. A hand-held labelling machine as recited in claim 18 wherein said font and format defining means includes means for storing format data, and said error checking means includes means for comparing the selected data from the data entry means with the stored format data and enabling the selected data entered to be printed only if the selected data has a predetermined relationship to the format data.

24. A hand-held labelling machine as recited in any one of claims 12–18 or 21–23 wherein said thermographic print head includes a straight line array of thermographic print elements disposed in a direction transverse to the direction of advancement of the web.

25. A hand-held labelling machine comprising: a housing having a manually engageable handle, the housing having means for holding a label supply roll of a composite web having labels releasably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means including data entry means on the housing for entering selected data to be printed, the printing means including a thermographic printing head having a plurality of individually selectable printing elements powered by a source of electrical energy for printing on a thermographic label at the printing position, means coupled to the data entry means for receiving and electrically processing data representative of the selected data entered via the data entry means, means electrically coupling the data receiving and processing means and the thermographic printing head, and means for causing the data receiving and processing means to operate the thermographic printing head to print the selected data on the label, wherein said data processing means includes control means for receiving the data and operating the printing elements in said thermographic printing head to print out selected data in a predetermined font and format, wherein said control means includes means for storing information representative of one of a plurality of fonts and formats, and is responsive to one of font and format identifying data received from said data entry means to select one of said plurality of fonts and formats, said control means further including means for providing a signal representative of a printable area or areas on the label defined by the selected format for rendering said print head operative while the composite web is being advanced by the advancing means to print the selected data in registration with the printable area or areas.

26. A hand-held labelling machine as recited in claim 25 further including means responsive to the identifying data for enabling a font or format to be selected only if identifying data corresponding to one of the stored fonts and formats is entered.

27. A hand-held labelling machine as recited in claim 25 further including means for determining whether the selected data to be printed is compatible with the selected format in order to restrict the data that may be entered by said data entry means to data compatible with the selected format once the format has been selected.

28. A hand-held labelling machine as recited in claim 25 further including means for comparing successively entered selected data and for enabling the entered selected data to be printed only if the same selected data is entered twice in succession.

29. A hand-held labelling machine as recited in claim 25 wherein said receiving and processing means further includes means responsive to the operation of the data entry means for rendering said labelling machine operative to print a selected number of labels in the selected one of the fonts and formats.

30. A hand-held labelling machine comprising: a housing having a manually engageable handle, the housing having means for holding a label supply roll of a composite web having labels releaseably adhered to a backing strip, means for printing on a label at a printing position, means for peeling the printed label from the backing strip, label applying means disposed adjacent the peeling means, means for advancing the web to peel a printed label from the backing strip at the peeling means and advance the printed label into label applying relationship with the label applying means and to advance another label into the printing position, means including data entry means on the housing for entering selected data to be printed, the printing means including a thermographic printing head having a plurality of individually selectable printing elements powered by a source of electrical energy for printing on a thermographic label at the printing position, means coupled to the data entry means for receiving and electrically processing data representative of the selected data entered via the data entry means, means electrically coupling the data receiving and processing means and the thermographic printing head, and means for causing the data receiving and processing means to operate the thermographic printing head to print the selected data on the label, wherein said data receiving and processing means includes font and format control means for causing the print-out of said data by said printing elements to be arranged in a selected one of a plurality of predetermined fonts and formats as defined by font and format identifying information stored in said data receiving and processing means, said font and format control means being operative to enable said data entry means to only accept input of predetermined font and format identifying data for selection of a desired font and format prior to entry of the selected data to be printed, and subsequently to determine whether the entered data represent a valid font and format, and once the font and format has been selected, enabling said data entry means to only accept input of data which are restricted to comply with the selected font and format.

31. A hand-held labelling machine as recited in claim 30 further including means for comparing successively entered selected data and for enabling the entered selected data to be printed only if the same selected data is entered twice in succession.

32. A hand-held labelling machine as recited in claim 30 wherein said receiving and processing means further includes means responsive to the operation of the data entry means for rendering said labelling machine operative to print a selected number of labels in the selected font or format or both.

* * * * *